United States Patent
Jamjoom et al.

(10) Patent No.: US 10,223,166 B2
(45) Date of Patent: *Mar. 5, 2019

(54) SCHEDULING HOMOGENEOUS AND HETEROGENEOUS WORKLOADS WITH RUNTIME ELASTICITY IN A PARALLEL PROCESSING ENVIRONMENT

(71) Applicant: International Business Machines Corporation, Armonk, NY (US)

(72) Inventors: Hani T. Jamjoom, Cos Cob, CT (US); Dinesh Kumar, Sleepy Hollow, NY (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/418,828

(22) Filed: Jan. 30, 2017

(65) Prior Publication Data

US 2017/0139749 A1    May 18, 2017

Related U.S. Application Data

(63) Continuation of application No. 13/897,796, filed on May 20, 2013, now Pat. No. 9,645,848.

(51) Int. Cl.
| | |
|---|---|
| *G06F 9/455* | (2018.01) |
| *G06F 9/46* | (2006.01) |
| *G06F 9/50* | (2006.01) |
| *G06F 9/48* | (2006.01) |

(52) U.S. Cl.
CPC .......... *G06F 9/5038* (2013.01); *G06F 9/4881* (2013.01); *G06F 9/4887* (2013.01); *G06F 9/50* (2013.01); *G06F 9/505* (2013.01); *G06F 9/46* (2013.01); *G06F 9/4843* (2013.01); *G06F 2209/483* (2013.01); *G06F 2209/503* (2013.01); *G06F 2209/5021* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 6,353,844 B1 | 3/2002 | Bitar et al. | |
| 6,675,190 B1 | 1/2004 | Schabernack et al. | |
| 8,397,236 B2 | 1/2013 | Gibson | |
| 9,645,848 B2* | 5/2017 | Jamjoom | G06F 9/4881 |
| 9,645,849 B2* | 5/2017 | Jamjoom | G06F 9/4881 |
| 2004/0187120 A1 | 9/2004 | Moore et al. | |
| 2005/0268299 A1 | 12/2005 | Picinich et al. | |

(Continued)

OTHER PUBLICATIONS

Hovestadt et al., "Scheduling in HPC Resource Management Systems: Queuing vs. Planning", 2003.*

(Continued)

*Primary Examiner* — Bradley A Teets
(74) *Attorney, Agent, or Firm* — JoAnn Crockatt; Ryan, Mason & Lewis, LLP

(57) ABSTRACT

Systems and methods are provided for scheduling homogeneous workloads including batch jobs, and heterogeneous workloads including batch and dedicated jobs, with run-time elasticity wherein resource requirements for a given job can change during run-time execution of the job.

19 Claims, 15 Drawing Sheets

(56) References Cited

U.S. PATENT DOCUMENTS

| | | | |
|---|---|---|---|
| 2008/0184248 | A1 | 7/2008 | Barua et al. |
| 2012/0042256 | A1 | 2/2012 | Jamjoom et al. |
| 2012/0057191 | A1 | 3/2012 | Gnanasambandam et al. |
| 2012/0096470 | A1 | 4/2012 | Bartfai-Walcott et al. |
| 2012/0303322 | A1* | 11/2012 | Rego .................... G06F 11/3495 702/182 |
| 2014/0215481 | A1* | 7/2014 | Piet ....................... G06F 9/5061 718/104 |
| 2017/0139752 | A1* | 5/2017 | Jamjoom .............. G06F 9/5038 |

OTHER PUBLICATIONS

Dror G. Feitelson, "Job Scheduling in Multiprogrammed Parallel Systems," Condensed Version, RC 19790 IBM, Aug. 1997, 102 pages.

M.V. Devarakonda et al., "Predictability of Process Resource Usage: A Measurement-Based Study on UNIX," IEEE Transactions on Software Engineering, Dec. 1989, pp. 1579-1586, vol. 15, No. 12.

P. Krueger et al., "Job Scheduling is More Important than Processor Allocation for Hypercube Computers," IEEE Transactions on Parallel and Distributed Systems, May 1994, pp. 488-497, vol. 5, No. 5.

A.W. Mu'Alem et al., "Utilization, Predictability, Workloads, and User Runtime Estimates in Scheduling the IBM SP2 with Backfilling," IEEE Transactions on Parallel and Distributed Systems, Jun. 2001, pp. 529-543, vol. 12, No. 6.

E. Krevat et al., "Job Scheduling for the BlueGene/L System," 8th International Workshop on Job Scheduling Strategies for Parallel Processing (JSSPP), Lecture Notes in Computer Science (LNCS), Jul. 2002, pp. 38-54, vol. 2537, Edinburgh, Scotland, United Kingdom.

Vivek Sarkar, "Determining Average Program Execution Times and their Variance," Proceedings of the ACM SIGPLAN Conference on Programming Language Design and Implementation (PLDI), Jun. 1989, pp. 298-312, vol. 24, No. 7.

S. Majumdar et al., "Scheduling in Multiprogrammed Parallel Systems," Proceedings of the ACM SIGMETRICS Conference on Measurement and Modeling of Computer Systems, May 1988, pp. 104-113, vol. 16, No. 1.

K. Li et al., "Job Scheduling in a Partitionable Mesh Using a Two-Dimensional Buddy System Partitioning Scheme," IEEE Transactions on Parallel and Distributed Systems, Oct. 1991, pp. 413-422, vol. 2, No. 4.

P. Krueger et al., "Processor Allocation vs. Job Scheduling on Hypercube Computers," 11th International Conference on Distributed Computing Systems, May 1991, pp. 394-401.

J. Skovira et al., "The EASY—LoadLeveler API Project," Workshop on Job Scheduling Strategies for Parallel Processing, Lecture Notes in Computer Science (LNCS), Apr. 1996, pp. 41-47, vol. 1162, Honolulu, Hawaii.

Y. Zhang et al., "The Impact of Migration on Parallel Job Scheduling for Distributed Systems," 6th International Euro-Par Conference, Lecture Notes in Computer Science (LNCS), Aug. 2000, pp. 242-251, vol. 1900.

M.A.S. Netto et al., "SLA-Based Advance Reservations with Flexible and Adaptive Time QoS Parameters," 5th International Conference on Service-Oriented Computing (ICSOC), Lecture Notes in Computer Science (LNCS), Sep. 2007, pp. 119-131, vol. 4749, Vienna, Austria.

U. Lublin et al., "The Workload on Parallel Supercomputers: Modeling the Characteristics of Rigid Jobs," IEEE Journal of Parallel and Distributed Computing, Nov. 2003, pp. 1105-1122, vol. 63, No. 11.

Melbourne Clouds Lab, "GridSim: A Grid Simulation Toolkit for Resource Modelling and Application Scheduling for Parallel and Distributed Computing," The Cloud Computing and Distributed Systems (CLOUDS) Laboratory, University of Melbourne, http://www.cloudbus.org/gridsim/, 2002, 9 pages.

C. Sosa et al., "IBM System Blue Gene Solution: Blue Gene/P Application Development," IBM International Technical Support Organization, http://www.redbooks.ibm.com/redbooks/pdfs/sg247287.pdf, Aug. 2009, 406 pages.

D. Klusáček et al., "Alea 2—Job Scheduling Simulator," Proceedings of the 3rd International Conference on Simulation Tools and Techniques (ICST) (SIMUTools), Mar. 2010, 10 pages, Torremolinos, Malaga, Spain.

S.J. Chapin et al., "Benchmarks and Standards for the Evaluation of Parallel Job Schedulers," Workshop on Job Scheduling Strategies for Parallel Processing (JSSPP), Lecture Notes in Computer Science (LNCS), Apr. 1999, pp. 67-90, vol. 1659, San Juan, Puerto Rico.

"Parallel Workloads Archive," http://www.cs.huji.ac.il/labs/parallel/workload/, Dec. 2005, 2 pages.

E.G. Coffman et al., "Performance Bounds for Level-Oriented Two-Dimensional Packing Algorithms," Society for Industrial and Applied Mathematics (SIAM) Journal on Computing, Nov. 1980, pp. 808-826, vol. 9, No. 4.

B. Sharma et al., "HybridMR: A Hierarchical MapReduce Scheduler for Hybrid Data Centers," http://www.cse.psu.edu/research/publications/tech-reports/2012/CSE-%2012-007%20tech-report.pdf, Penn State University, Technical Report CSE-12-007, Dec. 2012, 10 pages.

D. Kumar et al., "Scheduling Batch and Heterogeneous Jobs with Runtime Elasticity in a Parallel Processing Environment," IEEE 26th International Parallel and Distributed Processing Symposium Workshops & PhD Forum (IPDPSW), May 21-25, 2012, pp. 65-78.

E. Shmueli et al., "Backfilling with Lookahead to Optimize the Packing of Parallel Jobs," IEEE Journal of Parallel and Distributed Computing, Sep. 2005, pp. 1090-1107, vol. 65, No. 9.

* cited by examiner

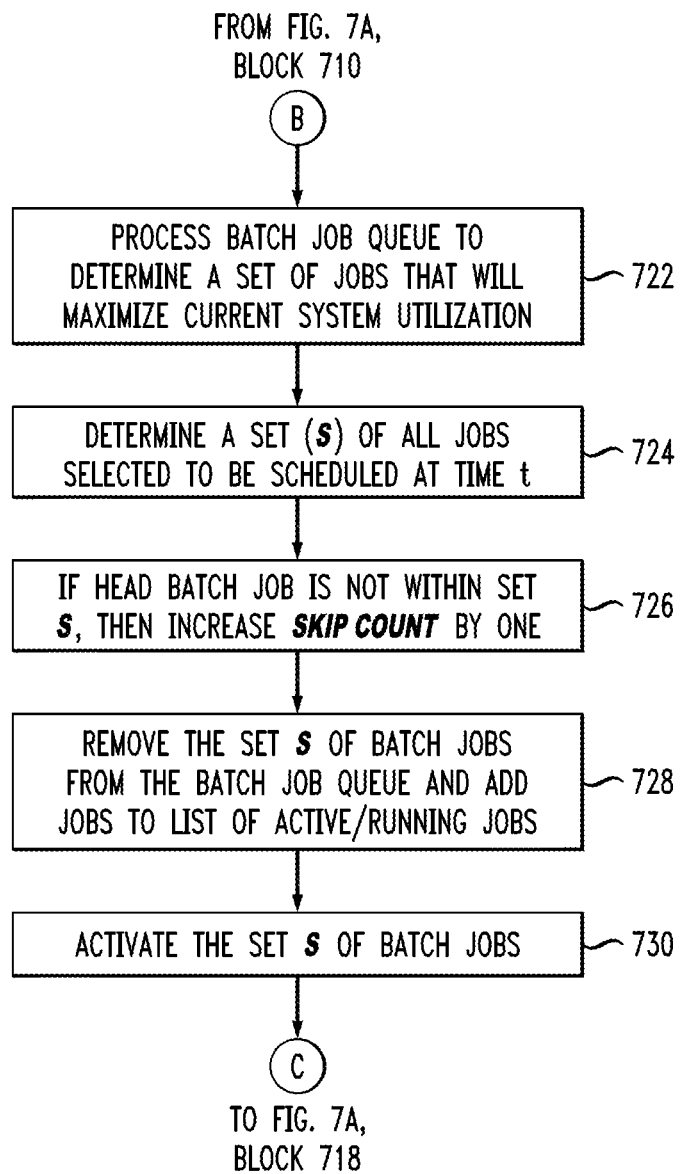

Algorithm 1 *Delayed − LOS :* Delayed_LOS_Batch_Scheduler(m)

1: $m \leftarrow M - \sum_{i=1}^{A} a_i.num;$
2: if $(m > 0)$ and $(W^b \neq \phi)$ then
3:   if $(w_1^b.num \leq m)$ and $(w_1^b.scount \geq C_s)$ then
4:     Remove $w_1^b$ from $W^b$ and add to $\mathcal{A};$
5:     Activate $w_1^b;$
6:   else if $(w_1^b.num \leq m)$ and $(w_1^b.scount < C_s)$ then
7:     Call Basic_DP;
8:     Compute $\mathcal{S};$
9:     if $(w_1^b \notin \mathcal{S})$ then $w_1^b.scount + +;$
10:     Remove $\mathcal{S}$ from $W^b$ and add to $\mathcal{A};$
11:     Activate $\mathcal{S};$
12:   else if $(w_1^b.num > m)$ then
13:     Compute $s$ such that: $m + \sum_{i=1}^{s-1} a_i.num < w_1^b.num \leq m + \sum_{i=1}^{s} a_i.num;$
14:     $fret_b \leftarrow t + a_s.res;$
15:     $frec_b \leftarrow m + \sum_{i=1}^{s} a_i.num - w_1^b.num;$
16:     $\forall w_i^b \in W^b$ such that $w_i^b.num \leq m: w_i^b.frenum \leftarrow (t + w_i^b.dur < fret_b) ? 0 : w_i^b.num;$
17:     Call Reservation_DP($frec_b$);
18:     Compute $\mathcal{S}_f;$
19:     Remove $\mathcal{S}_f$ from $W^b$ and add to $\mathcal{A};$
20:     Activate $\mathcal{S}_f;$
21:   end if
22: end if

FIG. 10

Algorithm 2 $Hybrid-LOS$ : Hybrid_LOS_Scheduler

1: $m \leftarrow M - \sum_{i=1}^{A} a_i.num$;
2: if $(m > 0)$ and $W^b \neq \phi)$ then
3:   if $(W^d = \phi)$ then
4:     Call Delayed_LOS_Batch_Scheduler$(m)$;
5:   else if $(W^d \neq \phi)$ and $(w_1^b.scount < C_s)$ then
6:     if $(w_1^d.start \leq t)$ then
7:       Call Move_Dedicated_Head_To_Batch_Head;
8:   else if $(t < w_1^d.start)$ then
9:     $fret_d \leftarrow w_1^d.start$;
10:     if $(w_1^d.start \leq t + a_A.res)$ then
11:       Compute $s$ such that: $t + a_{s-1}.res < w_1^d.start \leq t + a_s.res$;
12:       $frec_d \leftarrow M - \sum_{i=s}^{A} a_i.num$;
13:     else
14:       $frec_d \leftarrow M$;
15:     end if
16:     $tot\_start\_num \leftarrow \sum_i|_{w_i^d.start = w_1^d.start} w_i^d.num$;
17:     if $(tot\_start\_num \leq frec_d)$ then
18:       $frec_d \leftarrow frec_d - tot\_start\_num$;
19:       $\forall w_i^b \in W^b$ such that $w_i.num \leq m$: $w_i^b.frenum \leftarrow (t + w_i^b.dur < fret_d) ? 0 : w_i^b.num$;
20:       Call Reservation_DP$(frec_d)$;
21:       Compute $S_f$;
22:       if $(w_1^b \notin S_f)$ then $w_1^b.scount + +$;

```
23:     else
24:         Compute s such that: m + ∑_{i=1}^{s-1} a_i.num < tot_start_num ≤ m + ∑_{i=1}^{s} a_i.num;
25:         fret_d ← t + a_s.res;
26:         frec_d ← m + ∑_{i=1}^{s} a_i.num - tot_start_num;
27:         ∀w_i^b ∈ W^b such that w_i^b.num ≤ m: w_i^b.frenum ← (t + w_i^b.dur < fret_d) ? 0 : w_i^b.num;
28:         Call Reservation_DP(frec_d);
29:         Compute S_f;
30:         if (w_1^b ∉ S_f) then w_1^b.scount + +;
31:     end if
32:     Remove S_f from W^b and add to A;
33:     Activate S_f;
34:     end if
35:     else if (W^d ≠ φ) and (w_1^b.scount ≥ C_s) then
36:         Remove w_1^b from W^b and add to A;
37:         Activate w_1^b;
38:     end if
39:     else if (W^d ≠ φ) then
40:         if (w_1^d.start ≤ t) then
41:             Call Move_Dedicated_Head_To_Batch_Head;
42:         end if
43:     end if
44:     Call Hybrid_LOS_Scheduler at next event;
```

*FIG. 11 cont.−2*

| Algorithm 3 Move_Dedicated_Head_To_Batch_Head |
|---|
| if $(w_1^d \neq null)$ then <br>      $w^b \leftarrow new();$ <br>      $w^b.num \leftarrow w_1^d.num;$ <br>      $w^b.dur \leftarrow w_1^d.dur;$ <br>      $w^b.arr \leftarrow w_1^d.arr;$ <br>      $w^b.scount \leftarrow C_s;$ <br>      Remove $w_1^d$ from $\mathcal{W}^d$ and add $w^b$ to head of $\mathcal{W}^b;$ <br> end if |

SCHEDULING HOMOGENEOUS AND HETEROGENEOUS WORKLOADS WITH RUNTIME ELASTICITY IN A PARALLEL PROCESSING ENVIRONMENT

TECHNICAL FIELD

The field generally relates to systems and method for scheduling jobs in high-performance computing systems and, in particular, systems and methods for scheduling homogeneous workloads comprising batch jobs, and heterogeneous workloads comprising batch and dedicated jobs, with run-time elasticity wherein resource requirements for a given job can change during run-time execution of the job.

BACKGROUND

The ability to efficiently schedule jobs in a parallel processing environment is an important aspect of high-performance computing systems. In general, these jobs can include batch jobs and/or dedicated jobs. A batch job is one that does not have a user-specified start time and can be scheduled by a scheduler at some optimal time, depending on the scheduling protocol. A dedicated job is one having a user-requested start time that is fixed and not decided by a scheduler. Thus, unlike batch jobs, dedicated jobs are rigid in their start-times and must be commenced at the user-requested start time.

For homogeneous workloads comprising batch jobs only, the efficiency of a parallel processing computing system depends on how tightly packed the batch jobs can be scheduled so as to maximize system utilization while minimizing job wait times. At a high level, HPC (high performance computing) systems have generally used a queuing model to schedule incoming jobs, wherein most optimizations revolve around how an HPC system is packed and how the queue is managed to maximize system utilization while minimizing job wait times. Much of the complexity involves balancing the expected runtime needs of a given job against the scheduling of future jobs. Unpredictable wait times is a key issue in batch schedulers. For certain workloads, this unpredictability can be tolerated. For other workloads such as real-time workloads, however, better guarantees are required.

For example, for heterogeneous workloads comprising batch jobs and dedicated jobs, additional complexity arises because the process of scheduling flexible batch jobs around rigid dedicated jobs is non-trivial. Many scenarios in a parallel processing environment can be envisaged where some users need to run background simulation programs that are not time or deadline critical, while other users may require rigid and fixed time slots to execute jobs such as those for real-time traffic data processing during certain periods of the day/week, real-time geographical, satellite or sensor data processing during certain periods of the month/year. In this case, a single HPC scheduler must be capable of efficiently scheduling a heterogeneous workload of batch and dedicated jobs. State of the art HPC schedulers are designed for handling only batch jobs and are incapable of efficiently handling such heterogeneous workloads through a systematic and optimal methodology.

Furthermore, state of the art HPC schedulers for a parallel processing environment are generally optimized for submit-time elasticity of batch jobs only, where resource needs (e.g., user estimated job execution times) are specified only at submission time. Once batch jobs with user estimated execution times are submitted, they cannot be explicitly altered at runtime. Current HPC scheduling algorithms account for both scheduled termination (kill-by time), and premature termination before the user-estimated end time, but do not account for the inter-play of explicit, on-the-fly extensions or reductions in execution time, between batch and dedicated jobs. In other words, state of the art HPC schedulers are not designed for runtime elasticity of heterogeneous workloads, wherein runtime elasticity allows a user to change the execution time requirements (or other resource requirements) for a given job during execution of the given job. Adding runtime elasticity capability to a scheduling protocol, where jobs can expand and contract in their execution time on-the-fly, leads to even further complexity with regard to implementing an efficient scheduling algorithm to accommodate the runtime elasticity capability.

SUMMARY

Embodiments of the invention generally include systems and method for scheduling jobs in high-performance computing (HPC) systems and, in particular, systems and methods for scheduling homogeneous workloads comprising batch jobs, and heterogeneous workloads comprising batch and dedicated jobs, with run-time elasticity wherein resource requirements for a given job can change during run-time execution of the job.

In one embodiment, a method is provided for scheduling a homogeneous workload comprising batch jobs in a HPC system. The method includes maintaining a batch jobs queue having batch jobs, wherein each batch job in the batch jobs queue has a plurality of parameters associated therewith, the parameters including a num parameter that denotes a number of processors of the HPC system that are required to execute the batch job, a dur parameter that denotes a user-estimated execution time of the batch job, an arr parameter that denotes an arrival time of the batch job, and an scount parameter that specifies a number of scheduling cycles that the batch job was skipped and not scheduled. A scheduling cycle is triggered in response to a triggering event, and a scheduling process is performed to schedule one or more batch jobs in the batch jobs queue for execution by the HPC system. Performing a scheduling process includes determining a number m of available processors in the HPC system, and scheduling a head batch job in the batch jobs queue for execution in the HPC system if the num parameter of the head batch job is less than or equal to m and if the scount parameter of the head batch job is greater than or equal to an scount threshold value. In another embodiment, if the num parameter of the head batch job is less than or equal to m and if the scount parameter of the head batch job is not greater than or equal to the scount threshold value, then one or more other batch jobs in the batch jobs queue are processed to determine a set of one or more batch jobs that can be selected to maximize utilization of the HPC system based on the num parameters of the one or more other batch jobs in the batch jobs queue, and the scount parameter of the head batch job is increased by one.

In another embodiment, a method is provided for scheduling a heterogeneous workload comprising batch jobs and dedicated jobs in a HPC system. The method includes maintaining a batch jobs queue including batch jobs, wherein each batch job in the batch jobs queue has a plurality of parameters associated therewith, the parameters including a num parameter that denotes a number of processors of the HPC system that are required to execute the batch job, a dur parameter that denotes a user-estimated execution time of the batch job, an arr parameter that denotes an arrival time of the batch job, and an scount parameter that specifies a number of scheduling cycles that the batch job was skipped and not scheduled. The method further includes maintaining a dedicated jobs queue including dedicated jobs, wherein each dedicated job in the dedicated jobs queue has a plurality of parameters associated therewith, the parameters including a num parameter that denotes a number of processors of the HPC system that are required to execute the dedicated job, a dur parameter that denotes a user-estimated execution time of the dedicated job, and a start parameter that denotes a user-requested start time of the dedicated job. A scheduling cycle is initiated in response to a triggering event, and a scheduling process is performed to schedule one or more batch jobs in the batch jobs queue and one or more dedicated jobs in the dedicated jobs queue for execution by the HPC system. Performing a scheduling process includes determining a number m of available processors in the HPC system, and if the dedicated jobs queue is empty, then scheduling a head batch job in the batch jobs queue for execution in the HPC system if the num parameter of the head batch job is less than or equal to m and if the scount parameter of the head batch job is greater than or equal to an scount threshold value.

In another embodiment, if there are no available processors in the HPC system or if there are no pending batch jobs in the batch jobs queue, and if the dedicated jobs queue is not empty, then the scheduling process for a heterogeneous workload further includes determining if the start parameter of a head dedicated job in the dedicated jobs queue is less than or equal to a current time, moving the head dedicated job from the dedicated jobs queue to a head position in the batch jobs queue, if the start parameter of a head dedicated job in the dedicated jobs queue is less than or equal to a current time, ending the scheduling cycle if the start parameter of a head dedicated job in the dedicated jobs queue is not less than or equal to a current time.

In yet another embodiment, if the number m of available processors in the HPC system is greater than 0, and if the batch jobs queue and dedicated jobs queue are not empty, and if the scount parameter of the head batch job is NOT greater than or equal to an scount threshold value, then the scheduling process for a heterogeneous workload further includes determining if a start parameter value of a head dedicated job in the dedicated jobs queue is less than or equal to a current time, and moving the head dedicated job from the dedicated jobs queue to a head position in the batch jobs queue, if the start parameter value of the head dedicated job in the dedicated jobs queue is less than or equal to a current time.

These and other embodiments of the invention will become apparent from the following detailed description of illustrative embodiments thereof, which is to be read in connection with the accompanying drawings.

BRIEF DESCRIPTION OF THE DRAWINGS

FIGS. 7A, 7B and 7C depict a flow diagram of a method for scheduling a homogeneous workload comprising batch jobs, according to an embodiment of the invention.

FIG. 10 shows pseudo code of a process (Algorithm 1) for scheduling a homogeneous workload comprising batch jobs, according to an embodiment of the invention.

FIG. 11 shows pseudo code of a process (Algorithm 2) for scheduling a heterogeneous workload comprising batch jobs and dedicated jobs, according to an embodiment of the invention, as well as pseudo code of a process (Algorithm 3) for moving a dedicated job into a head position of a batch jobs queue, according to an embodiment of the invention.

DETAILED DESCRIPTION

Figure 1:
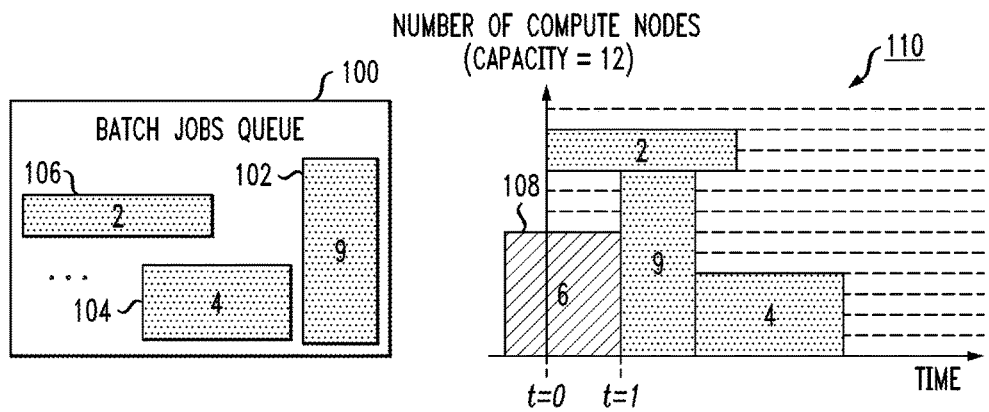
FIG. 1 illustrates a process for scheduling a homogeneous workload comprising batch jobs using a standard LOS scheduling protocol.

Embodiments of the invention will now be described in further detail with regard to systems and methods for scheduling homogeneous workloads comprising batch jobs, and heterogeneous workloads comprising batch and dedicated jobs, with run-time elasticity wherein resource requirements for a given job can change during run-time execution of the job. In general, embodiments of the invention as described herein include job scheduling protocols that are based, in part, on extensions to scheduling protocols as described in the article Shmueli, et al, entitled "Backfilling with Lookahead to Optimize the Packing of Parallel Jobs," *IEEE J. Parallel and Distributed Comput.* (September 2005) 1090-1107, which is incorporated herein by reference. Shmueli, et al. disclose a scheduling protocol referred to as LOS (Lookahead Optimizing Scheduler) which is designed to handle homogeneous workloads comprising only batch jobs. Unlike other schedulers that consider queued batch jobs one at a time, the LOS scheduling protocol considers all batch jobs in a queue at a given time wherein the scheduling decisions are based on the entire content of the queue so as to maximize utilization at each scheduling cycle.

In general, LOS uses dynamic programming to find an optimal multi-job combination for filling a schedule. In some cases, it is possible to achieve the same utilization using several alternative sets of jobs. The LOS algorithm respects the arrival order of the jobs, and uses the set of jobs that is closer to the head of the queue. The LOS process takes a greedy approach to achieve a local optimum, but not necessarily a global optimum. A globally optimal algorithm that uses off-line, linear or quadratic programming may run into scalability issues with large number of jobs or when anticipating future arrival of jobs. Moreover, it is hard to accurately predict future arrivals and an off-line algorithm cannot be used for runtime elastic workloads.

More specifically, the LOS protocol described by Shmueli, et al., comprises two fundamental processing stages, including a first dynamic programming process, referred to herein as Basic_DP, and a second dynamic programming process, referred to herein as Reservation_DP. In the Basic_DP stage, a queue of batch jobs waiting in a batch jobs queue are processed, with emphasis on the head batch job in queue, to find a combination of batch jobs that would maximize current system utilization. If the batch job at the head of the batch jobs queue fits within the free capacity of the system, the head batch job is immediately started, along with one or more other pending batch jobs depending on the remaining system capacity. Otherwise, the Reservation_DP process is called to make a reservation for the head batch job so as to prevent the risk of starvation. The remainder of the waiting batch jobs in the queue are then processed using the Reservation_DP process to select a set of jobs that will maximize system utilization at the current time, while not violating the reservation made for the head batch job.

The LOS process differs from a standard "Backfilling" scheduling process in which a queue is serially scanned to schedule any job whose size is less than or equal to a current free capacity of the system. If there are a large number of small jobs waiting behind a large job at the head of the queue, the small jobs can be repeatedly picked to maximize utilization, if the available capacity is less than the size of the large job. Thus, with a standard Backfilling process, a large job at head of queue could be skipped repeatedly. Thus, in contrast to simply finding the right combination of jobs that maximize utilization at a given time as with the Backfilling process, a standard LOS process will start the job at head of queue right away if enough capacity is available. This bounds the waiting time of the large job at head of queue. If enough capacity is not available, then a reservation is made for starting the head job in the future by considering the remaining or residual execution time of running jobs. The queue is then scanned to find the right set of jobs to fill in holes before the reservation time. Thus, the Reservation_DP process is a modified version of the Basic_DP process.

FIG. 1 illustrates a process for scheduling a homogeneous workload comprising batch jobs using a standard LOS scheduling protocol. In particular, FIG. 1 illustrates a batch jobs queue 100 comprising a plurality of pending batch jobs represented by shaded blocks, including a first batch job 102, a second batch job 104 and a third batch job 106. For purposes of explanation, it is assumed that the arrival order of the jobs is the first batch job 102, followed by the second batch job 104, and followed by the third batch job 106, wherein the first batch job 102 is considered to be the head batch job (positioned at the head of the queue 100). Moreover, it is assumed that the first batch job 102 is a job of size n=9, the second batch job 104 is of size n=4, and that the third batch job 106 is of size n=2, wherein the size n of a job represents a number of computing nodes (processors) in the processing system that are assigned to the job. In the example of FIG. 1, the vertical height of the shaded block of a given batch job represents the number n of processors assigned to the given batch job, and the horizontal width of the shaded block represents a user-requested execution time to complete the given batch job.

FIG. 1 depicts a graph 110 which graphically illustrates an example of scheduling results for the queued batch jobs after execution of a LOS scheduling cycle. A vertical axis of the graph 110 denotes a number of computing nodes (processors) with a system total capacity of 12 nodes, and the horizontal axis denotes time. In the example of FIG. 1, is assumed that an executing batch job 108 of size 6 is previously scheduled and executing at a time when the first, second and third batch jobs 102, 104 and 106 arrive into the batch jobs queue 100, and subsequently scheduled at time, t=0. At time=-0, the head batch job 102 is not scheduled for execution, because there is insufficient system capacity to execute the batch job 102 of size 9 at the same time as the executing job 108 of size 6 (i.e., 6+9 exceeds the system capacity of 12 computing nodes).

As such, a reservation is made at time t=1 for scheduling the execution of the head batch job 102. Moreover, with the Reservation_DP process, the scheduler determines that the pending batch job 106 (of size 2) can be scheduled for execution at time t=0 because there is sufficient system capacity, and because scheduling the batch job 106 would not violate the reservation for the head batch job 102 at time t=1. In other words, when the executing batch job 108 terminates and the head batch job 102 is scheduled to commence execution, there is sufficient system capacity to have both batch jobs 102 and 106 executing at time t=1. On the other hand, despite there being sufficient capacity at time t=0 to schedule the execution of the pending batch jobs 104 (of size 4) and 106 (of size 2) along with the already executing batch job 108 (of size 4), the batch job 104 (of size 4) will not be scheduled at time=0. This is because scheduling of the batch job 104 would violate the reservation of the head batch job 102 at time t=1 because there would be insufficient system capacity to execute the head batch job 102 (of size 9) at the same time (at time t=1) as the batch job 104 (of size 4). Accordingly, as shown in FIG. 1, with the standard LOS process, the batch job 104 is scheduled for execution after termination of the head batch job 102.

Figure 2:
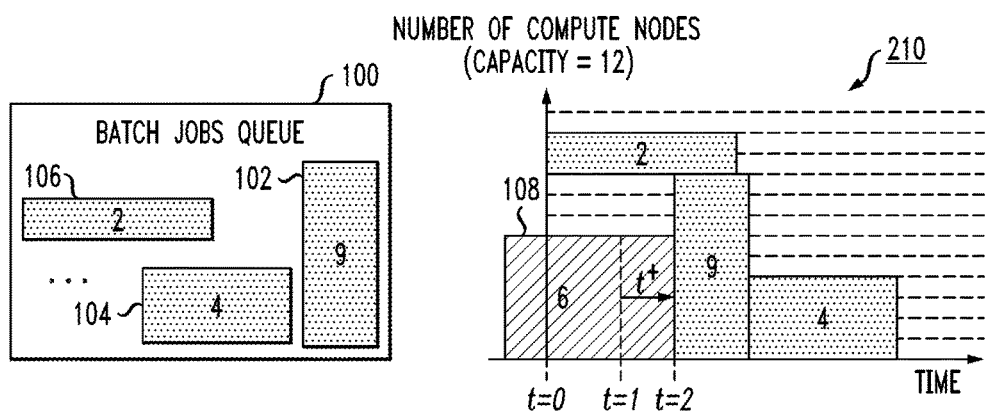
FIG. 2 illustrates a process for a process for scheduling a homogeneous workload comprising batch jobs using a LOS scheduling protocol with run-time elasticity, according to an embodiment of the invention.

The standard LOS protocol does not implement runtime elasticity in which the execution time requirements of a given job can explicitly change while the given job is pending in queue (already submitted) or is being executed. In accordance with embodiments of the invention, scheduling protocols are implemented to extend a standard LOS protocol to incorporate runtime elasticity into the scheduling protocol. For example, FIG. 2 illustrates a process for scheduling a homogeneous workload comprising batch jobs using a LOS scheduling protocol with run-time elasticity, according to an embodiment of the invention. Similar to the example shown in FIG. 1, FIG. 2 shows a batch jobs queue 100 comprising a plurality of pending batch jobs including a first batch job 102, a second batch job 104, and a third batch job 106. Moreover, FIG. 2 depicts a graph 210 which graphically illustrates scheduling results for the queued batch jobs after execution of a LOS scheduling cycle in which the runtime execution requirement for the executing job 108 is modified.

In particular, the graph 210 of FIG. 2 shows a change in the execution time ($t^+$) of the executing job 108 which results in the execution time of the job 108 extending from an original termination time at t=1 to an extended termination time of t=2. Applying the same scheduling example discussed above with regard to the graph 110 of FIG. 1, similar scheduling results would result based on the LOS protocol as shown in the graph 210 of FIG. 2, except that due to the increase in the execution time ($t^+$) of the executing job 108, the reservation time for the head batch job 102 (of size 9) is set to a later time t=2. As with the scheduling example discussed above with regard to FIG. 1, despite there being sufficient capacity at time t=0 to schedule the execution of the pending batch jobs 104 (of size 4) and 106 (of size 2)

along with the already executing batch job 108 (of size 4), the batch job 104 (of size 4) will not be scheduled at time t=0. This is because scheduling of the batch job 104 would violate the reservation of the head batch job 102 at time t=2, as there would be insufficient system capacity to execute the head batch job 102 (of size 9) at the same time (at time t=2) as the batch job 104 (of size 4) at time t=2. Accordingly, as shown in FIG. 2, with the standard LOS process, the batch job 104 is scheduled for execution after termination of the head batch job 102.

As shown in the graph 210 of FIG. 2, a straightforward implementation of time elasticity with the LOS protocol can negatively impact the scheduling of future jobs as there is a long time period from t=0 to r=2 in which the system capacity is underutilized. Indeed, as shown in FIG. 2, there are 4 unused computing nodes during the time period from t=0 to t=2, and this time period is just slightly longer than the execution duration of the batch job 104 (of size 4). In accordance with embodiments of the invention, consideration is given to balancing the needs of queued or executing jobs in which the runtime execution requirements are modified on-the-fly, with the need to efficiently scheduling pending batch jobs in queue to optimally maximize system utilization. For homogenous workloads comprising batch jobs, a scheduling protocol referred to herein as "Delayed-LOS" is implemented to effectively schedule homogeneous workloads with run time elasticity and maximize system utilization.

Figure 3:
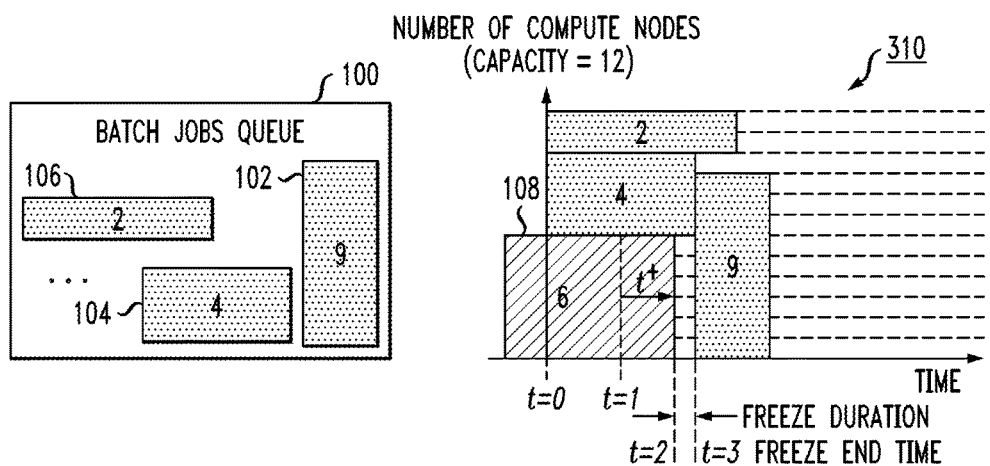
FIG. 3 illustrates a process for scheduling a homogeneous workload comprising batch jobs using a Delayed-LOS scheduling protocol with run-time elasticity, according to an embodiment of the invention.

For example, FIG. 3 illustrates a process for scheduling a homogeneous workload comprising batch jobs using a Delayed-LOS scheduling protocol with run-time elasticity, according to an embodiment of the invention. Similar to the example shown in FIG. 2, FIG. 3 shows a batch jobs queue 100 comprising a plurality of pending batch jobs including a first batch job 102, a second batch job 104, and a third batch job 106. Moreover, FIG. 3 depicts a graph 310 which graphically illustrates scheduling results for the queued batch jobs after execution of a LOS scheduling cycle in which the run time execution requirements for the executing job 108 is modified.

In particular, similar to the graph 210 of FIG. 2, the graph 310 of FIG. 3 shows a change in the execution time ($t^+$) of the executing job 108 which results in the execution time of the job 108 extending from an original termination time at t=1 to an extended termination time of t=2. However, rather than reserving the execution time of the head batch job 102 (of size 9) at time t=2, the scheduling of the execution time of the head batch job 102 is delayed until time t=3 to enable execution of the batch job 104 (of size 4) in the period from t=0 to t=3. The period from time t=2 to t=3 is referred to herein as a "freeze duration" or "freeze period", and the time t=3 is referred to as a "freeze end time". In this example of FIG. 3, the delayed scheduling of the head batch job 102 as an extension to the LOS protocol enables more efficient job packing in the period from t=0 to t=3 and, thus, maximizes system utilization. Embodiments of Delayed-LOS scheduling protocols according to the invention will be discussed in further detail with reference to FIGS. 7A, 7B, 7C and FIG. 10, for example.

Figure 4:
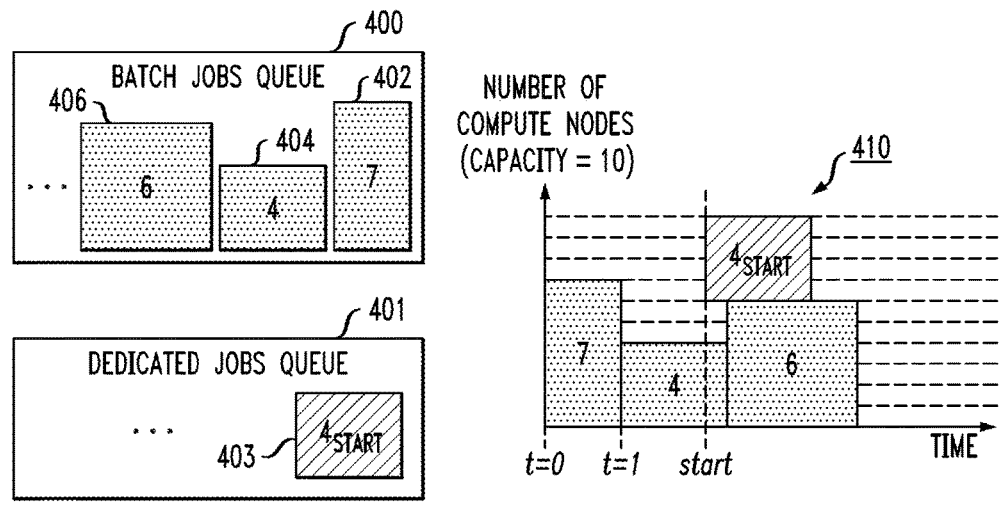
FIG. 4 illustrates a process for scheduling a heterogeneous workload comprising batch jobs and dedicated jobs.

FIG. 4 illustrates a process for scheduling a heterogeneous workload comprising both batch jobs and dedicated jobs using a standard scheduling protocol. In particular, FIG. 4 illustrates a batch jobs queue 400 comprising a plurality of pending batch jobs represented by shaded blocks, including a first batch job 402, a second batch job 404, and a third batch job 406. For purposes of explanation, it is assumed that the arrival order of the jobs is the first batch job 402, followed by the second batch job 404, and followed by the third batch job 406, wherein the first batch job 402 is considered to be the head batch job. Moreover, it is assumed that the first batch job 402 is a job of size n=7, the second batch job 404 is of size n=4, and that the third batch job 406 is of size n=6. FIG. 4 further illustrates a dedicated jobs queue 401 comprising a dedicated job 403 of size n=4, wherein a subscript "start" denotes an example user-requested "start" time of the dedicated job 403.

FIG. 4 depicts a graph 410 which graphically illustrates an example of scheduling results for the queued batch and dedicated jobs after execution of a scheduling protocol (such as a LOS protocol that is extended to consider dedicated jobs) in an HPC system having a maximum capacity of 10 computing nodes. In the example of FIG. 4, with the LOS protocol, the head batch job 402 is immediately scheduled for execution at time t=0 since there is sufficient system capacity to execute the head batch job 402 (size 7). However, there is insufficient system capacity (3 nodes) at time t=0 to schedule the execution of the batch job 404 (size 4) or the batch job 406 (size 6). As further shown in the graph 401 of FIG. 4, after the execution of the head batch job 402 is complete at time t=1, the next head batch job 404 (of size 4) is immediately scheduled for execution, since there is sufficient system capacity to execute the batch job 404 (of size 4) at the time t=1. While there is sufficient system capacity at time t=1 to execute the pending batch job 406 (of size 6), the batch job 406 is not scheduled for execution because there would be insufficient system capacity at time t=start to execute the dedicated job 403 waiting in the dedicated queue 401. In particular, since the end times of the batch jobs 404 and 406 would exceed the start time of the dedicated job 403, there would be insufficient system capacity at time t-start to schedule the execution of batch job 406 concurrently with batch job 404, without violating the rigid start time requirement of the dedicated job 403.

Accordingly, as shown in the graph 410 of FIG. 4, the dedicated job 403 is scheduled for execution at time t-start and concurrently executes with the batch job 404 for a short period of time. In this regard, the scheduling of the batch job 404 (of size 4) is proper at time=1 as there is sufficient system capacity to begin executing the dedicated job 403 (of size 4) at some point during execution of the batch job 404. Moreover, the batch job 406 can be scheduled for execution immediately after the batch job 404 is complete since there is sufficient system capacity to start execution of the batch job 406 while the dedicated job 403 is executing.

As shown in the graph 410 of FIG. 4, a straightforward implementation of scheduling dedicated jobs (with rigid start times) along with batch jobs using the LOS protocol can negatively impact the scheduling of future jobs, as there is a long time period from t=1 to t=start in which the system capacity is underutilized. Indeed, as shown in FIG. 4, there are 6 unused computing nodes during the time period from t=1 to t=start. In accordance with embodiments of the invention, consideration is given to balancing the needs of queued/executing batch/dedicated jobs in which the runtime requirements can be modified on-the-fly with the need to efficiently schedule pending jobs and optimally maximize system utilization. For heterogeneous workloads comprising batch jobs and dedicated jobs, a scheduling protocol referred to herein as "Hybrid-LOS" is implemented to effectively schedule heterogeneous workloads with run time elasticity and maximize system utilization.

Figure 5:
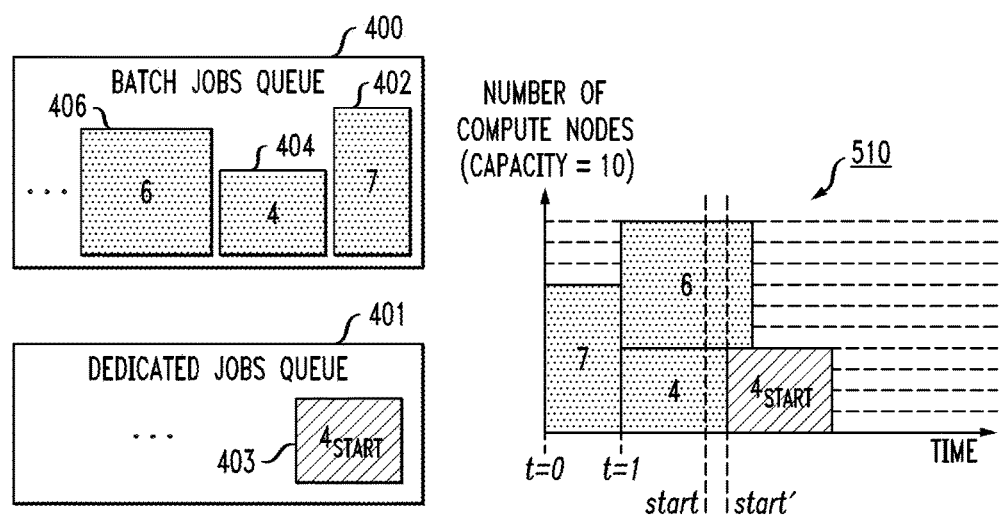
FIG. 5 illustrates a process for scheduling a heterogeneous workload comprising batch jobs and dedicated jobs using a Hybrid-LOS scheduling protocol with run-time elasticity, according to an embodiment of the invention.

For example, FIG. 5 illustrates a process for scheduling a heterogeneous workload comprising both batch jobs and dedicated jobs using a Hybrid-LOS scheduling protocol with run-time elasticity, according to an embodiment of the invention. The pending jobs and scheduling results shown in FIG. 5 are similar to those shown in FIG. 4, except that FIG. 5 shows a slight delay in the user-requested start time of the dedicated job 403 to maximize system utilization. In particular, as shown in the graph 510 of FIG. 5, the user-requested start time of the dedicated job 403 is delayed from the time t=start to the time t-start'. The delayed scheduling of the dedicated job 403 enables concurrent scheduling of the batch job 406 (of size 6) with the batch job 404 (of size 4) at the time t=1 to maximize utilization of the system capacity (which is 10 computing nodes). In this regard, the delayed start time of t-start' is selected at the time when the execution of the batch job 404 (of size 4) is terminated. At the time t=start', when the batch job 404 terminates, there is sufficient system capacity to have the dedicated job 403 execute concurrently with the batch job 406 (of size 6). It is to be noted that the amount of delay (or tolerance) that an HPC system can add to a user-requested start time of a dedicated job can be specified according to some HPC system tolerance parameter that the user accepts upon the condition of submitting a dedicated job to the HPC system, or the amount of delay can be some tolerance factor that is actually provided by the user at submission time of the dedicated job, etc. Embodiments of Hybrid-LOS scheduling protocols according to the invention will be discussed in further detail with reference to FIGS. 7A, 7B, 7C and FIG. 10, for example.

Figure 6:
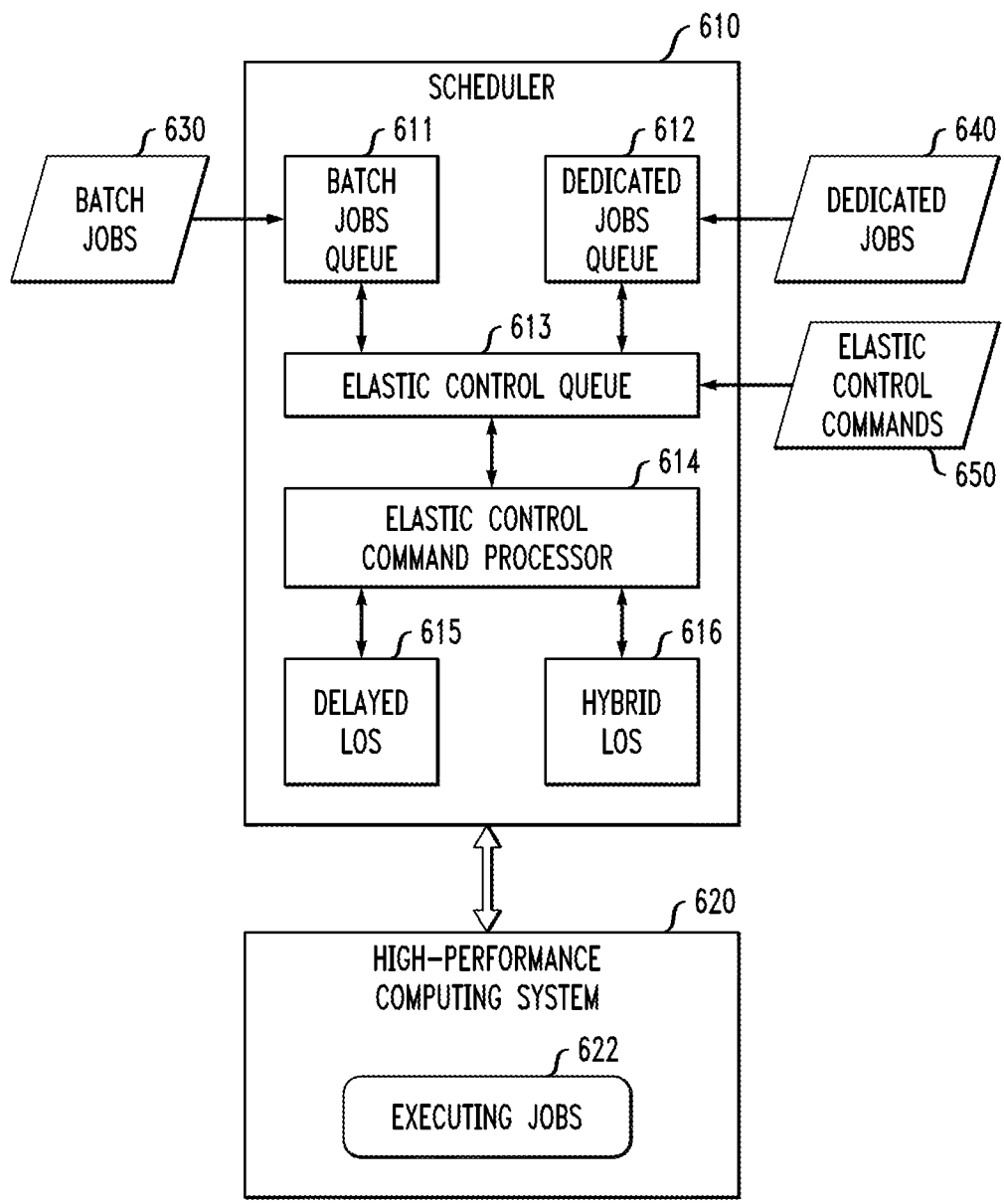
FIG. 6 is a block diagram of a system for scheduling homogenous and heterogeneous workloads in an HPC environment, according to an embodiment of the invention.

FIG. 6 is a block diagram of a system for scheduling homogenous and heterogeneous workloads in an HPC environment, according to an embodiment of the invention. As shown in FIG. 6, a system 600 generally comprises a scheduler 610 and a HPC system 620 (e.g., parallel computer system). The scheduler 610 comprises a batch jobs queue 611, a dedicated jobs queue 612, an elastic control queue 613, an elastic control command processor 614, a delayed-LOS process 615, and a Hybrid-LOS process 616. The HPC system 620 may be any parallel processing system such as International Business Machine's BlueGene/P system in which nodes are clustered in groups of 32 processors each, or any other parallel processing environment in which each executing job 622 includes a number of concurrently executing processes that are executed using a plurality of parallel processors.

The batch jobs queue 611 receives and temporarily stores incoming batch jobs 630. The dedicated jobs queue 62 receives and temporarily stores incoming dedicated jobs 640. In one embodiment of the invention, the Delayed-LOS process 615 and the Hybrid-LOS process 616 operate to schedule non-elastic workloads in which the execution times of jobs do not dynamically change at runtime. To support run-time elasticity wherein the execution times of jobs can be changed after they are submitted to the scheduler 610, the scheduler 610 implements the elastic control command processor 614 to process elastic control commands 650 (ECCs) that are stored in the elastic control queue 613. In one embodiment of the invention, an ECC 650 is a command that is issued by a user to extend or reduce a user-estimated execution time of a given job, which was originally specified at submission time of the given job. An ECC 650 can be issued for one or more executing jobs 622 (executing batch or dedicated jobs) in the HPC system 620, or for a given batch job or dedicated job that is stored in the batch jobs queue 611 or the dedicated jobs queue 612 waiting to be scheduled. In one embodiment of the invention, the incoming ECCs 650 stored in the elastic control queue 613 are processed on a first-come first-serve (FCFS) basis by the ECC processor 614. In an embodiment of the invention, a maximum count on number of ECCs can be imposed for a given job.

The ECCs 650 are explicitly issued by a user and are different from the implicit "kill-by time" that is computed based on the originally specified user-estimated execution time. In contrast, an ECC results in a change of a "kill-by time" and, therefore, a change in the actual job execution time. A change in the job execution time can result in a change in the residual or remaining execution times of executing jobs 622 in the HPC system 620 as well. As discussed in further detail below, the Delayed-LOS process 615 and Hybrid-LOS process 616 each consider the residual execution times of jobs in their respective job scheduling protocols. As such, any change in the runtime requirement of a given batch or dedicated job, as triggered by an ECC command 650 issued by the user or system, would bring runtime elasticity into the system 600. When an ECC 650 triggers the increase in runtime of a batch or dedicated job in one of the queues 611 or 612 or an executing job 622 in the HPC system 620, a new scheduling cycle is initiated whereby the Delayed-LOS process 615 or the Hybrid LOS process 616 will recompute a job schedule based on the new "elastically increased" runtime requirement of a given job. While the Delayed-LOS process 615 works for homogeneous workloads of batch jobs that may be elastically modified in terms of their runtime requirements, the Hybrid-LOS process 616 (which incorporates the Delayed LOS process 615) operates to schedule a heterogeneous workload comprising batch jobs that may be elastically modified and rigid or dedicated jobs that have a fixed user-requested start time (with a certain user and/or system specified tolerance that the Hybrid-LOS process 616 can consider when scheduling jobs).

In one embodiment of the invention, the Delayed-LOS process 615 implements scheduling protocols that will be discussed in detail below with reference to the flow diagram of FIGS. 7A, 7B and 7C, and the pseudo code Algorithm 1 shown in FIG. 10. In another embodiment of the invention, the Hybrid-LOS process 616 implements scheduling protocols that will be discussed in detail below with reference to the flow diagram of FIGS. 8A, 8B and 8C, and the pseudo code Algorithms 2 and 3 shown in FIG. 11. For purposes of describing the Delayed-LOS 615 and Hybrid-LOS 616 scheduling protocols of the scheduler 610, the following notations, as set forth in the pseudo code Algorithms 1, 2 and 3 in FIGS. 10 and 11, are applied.

M denotes a total number of computing nodes (processors) that are available in the HPC system 620.

m denotes a total number of free or unreserved nodes that are available at a given time t in the HPC system 620, wherein M−m is the number of computing nodes that are reserved at a given time t.

$\mathcal{W}^b$ denotes the batch jobs queue 611 of all waiting batch jobs: $\mathcal{W}^b = \{w_1^b, w_2^b, \ldots, w_B^b\}$, where $B = |\mathcal{W}^b|$. Each batch job $w_i^b$ in the batch jobs queue 611 is represented by a tuple: $w_i^b = (\text{num}, \text{dur}, \text{arr}, \text{scount})_i^b$, where num is a parameter that denotes the size or number of node required as part of the given batch job, dur is a parameter that denotes the duration or user-estimated execution time of the batch job, arr is a parameter that denotes an arrival time of the batch job, and scount is parameter that denotes a "skip count", i.e., a number of times or scheduling cycles that the batch job was skipped and was not scheduled. $C_s$ is a parameter that denotes an upper threshold value on scount.

$\mathcal{W}^d$ denotes list of all waiting dedicated jobs in the dedicated jobs queue 612, where and where D $\mathcal{W}$ $\mathcal{W}^d = \{$ $w_1^d, w_2^d, \ldots, w_D^d\}$, where $D=|\mathcal{W}^d|$. Each batch job $w_i^d$ in the dedicated jobs queue 612 is represented by a tuple: $w_i^d=(\text{num}, \text{dur}, \text{start})_i^d$, where num is a parameter that denotes the size or number of computing nodes required as part of the given dedicated job, dur is a parameter that denotes the duration or user-estimated execution time of the dedicated job, and start is a parameter that denotes a user-requested start time of the dedicated job.

$\mathcal{A}$ denotes a sorted list of all active/running jobs (executing jobs 622) in the HPC system 620 including both batch and dedicated jobs. In particular, $\mathcal{A}=\{a_1, a_2, \ldots, a_A\}$, where $A=|\mathcal{A}|$. Each active job $a_i$ is represented by a tuple $a_i=(\text{num}, \text{res})$, where num is a parameter that denotes a number of computing nodes on which the active job is running and res is a parameter that denotes the residual or remaining execution time of the active job.

$\mathcal{S}$ denotes a set of all jobs selected to be scheduled at a given time t computed after a Basic_DP process is called.

$\mathcal{S}_f$ denotes a set of all jobs selected to be scheduled at time t computed after the Reservation_DP process is called. The Reservation_DP process implements "freeze" durations to avoid starvation of large jobs.

$\text{fret}_b$ and $\text{fret}_d$ denote a "freeze end time" for batch jobs and dedicated jobs, respectively.

$\text{frec}_b$ and $\text{frec}_d$ denote a "freeze end capacity" for batch jobs and dedicated jobs, respectively.

frenum denotes a number of nodes required at the "freeze end time" for batch jobs present in the batch jobs queue, $\mathcal{W}^b$ Moreover, in one embodiment of the invention, in the scheduling processes represented by Algorithms 1, 2 and 3, the following invariant constraints are applied:

(i) num≤M, start≥t+1;

(ii) The batch jobs queue 611, $\mathcal{W}^b$, is maintained as a FIFO queue in order of arrival time, where $w_1^b\cdot\text{arr} \leq w_2^b\cdot\text{arr} \leq \ldots \leq w_B^b\cdot\text{arr}$;

(iii) $\mathcal{W}^d$ is maintained as a sorted list in increasing instants of start time of dedicated jobs, i.e., $w_1^d\cdot\text{start} \leq w_2^b\cdot\text{start} \leq \ldots \leq w_D^d\cdot\text{start}$. In this regard, the head dedicated job at the head of the dedicated jobs queue 612 is the dedicated job having the next start time of all the dedicated jobs in the dedicated jobs queue, and (iv) $\mathcal{A}$ is maintained as a sorted list in increasing order of residual duration, at $a_i\cdot\text{res}$, i.e., $a_1\cdot\text{res} \leq a_2\cdot\text{res} \leq \ldots \leq a_A\cdot\text{res}$.

Moreover, the input to the Delayed-LOS process 615 is {M, $\mathcal{W}^b$}. The input to the Hybrid-LOS process 616 is {M, $\mathcal{W}^b$, $\mathcal{W}^d$}. The batch and dedicated jobs queues $\mathcal{W}^b$ and $\mathcal{W}^d$ are updated in real-time with newly arriving jobs. The output of the Delayed-LOS process 615 and the Hybrid-LOS process 616 are the sets $\mathcal{S}$ and $\mathcal{S}_f$ respectively, which translate into an update of $\mathcal{A}$.

Figure 7A:
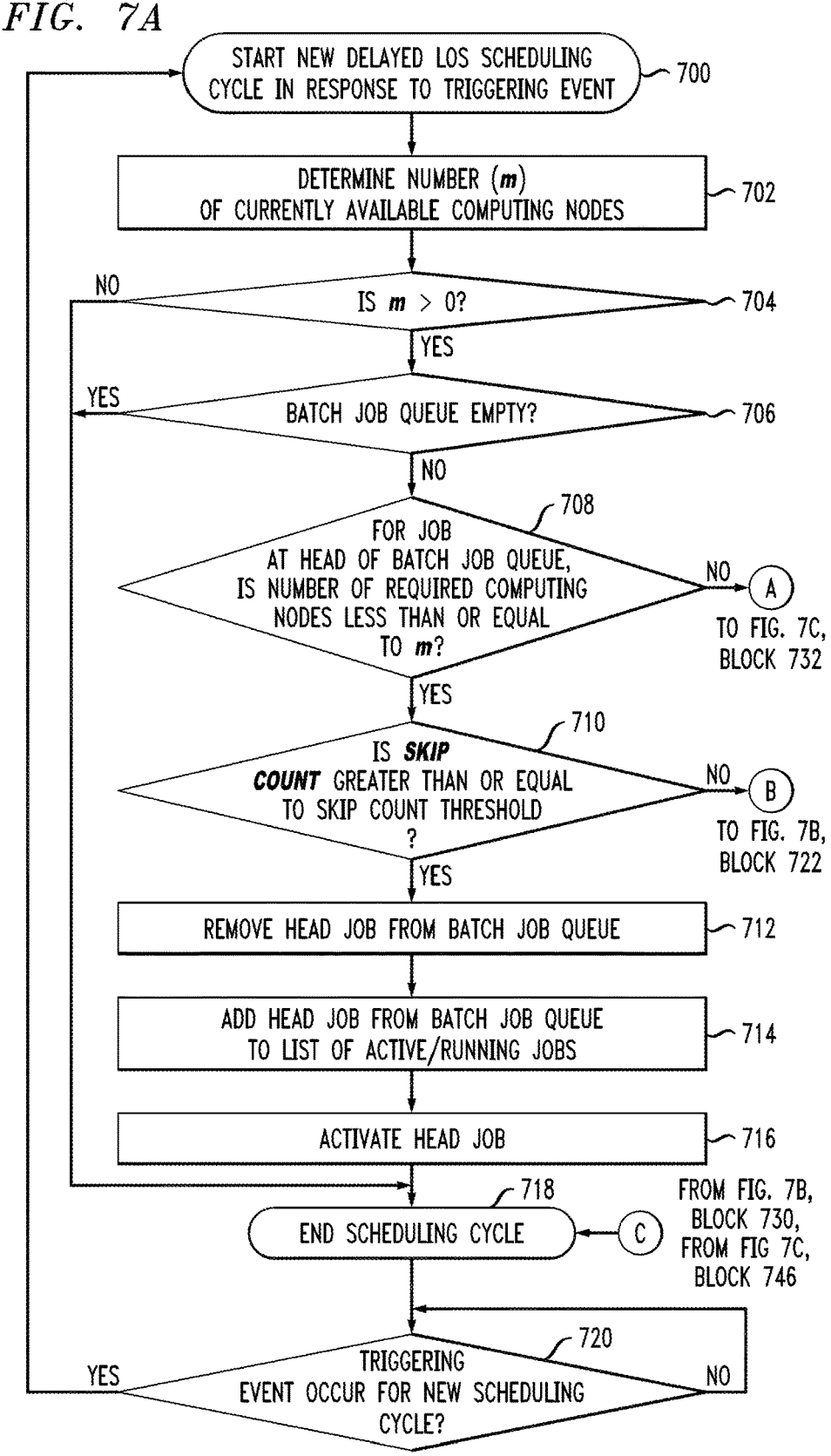
Figure 7C:
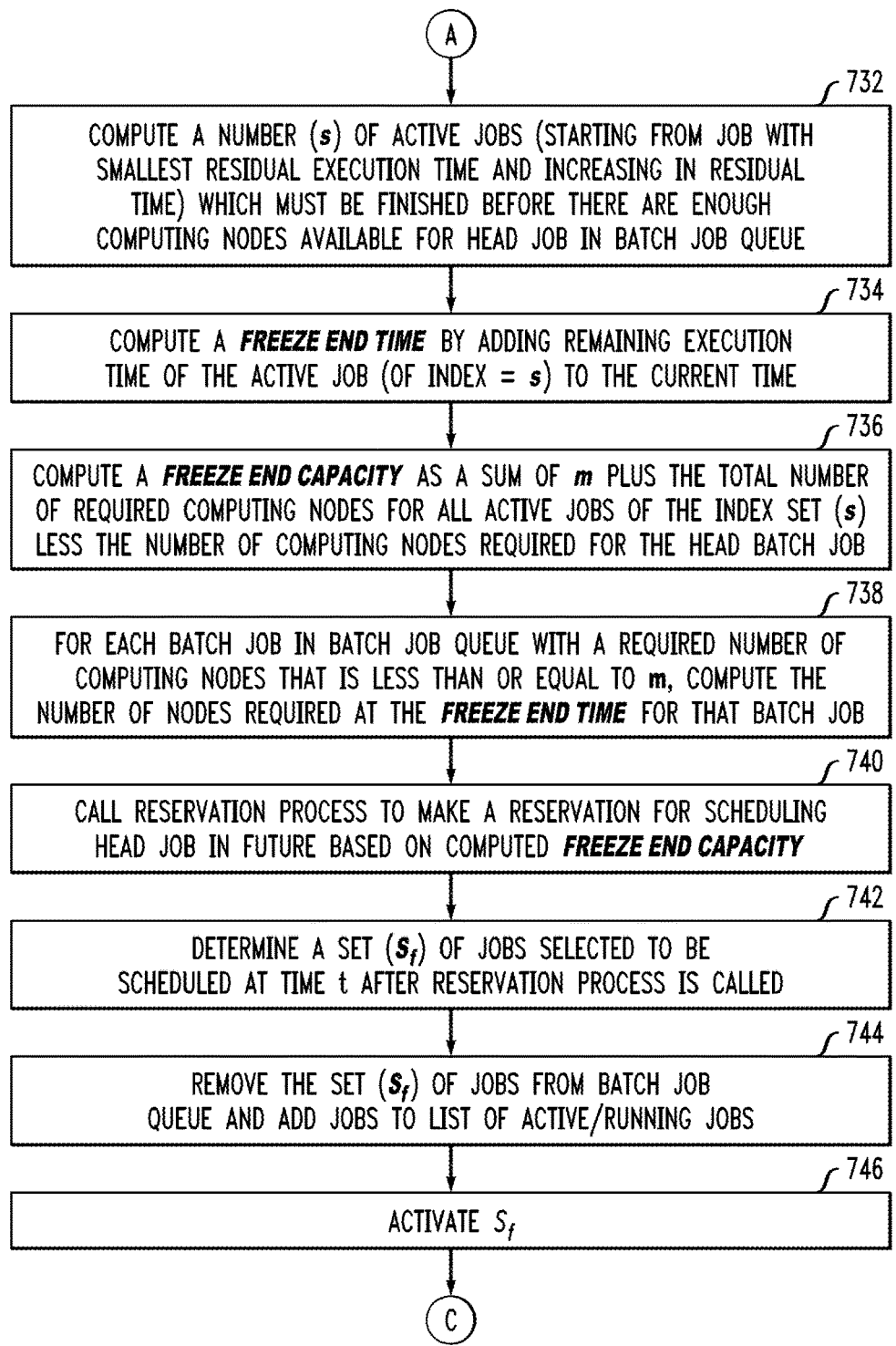

FIGS. 7A, 7B and 7C depict a flow diagram of a method for scheduling a homogeneous workload comprising batch jobs, according to an embodiment of the invention. More specifically, FIGS. 7A, 7B and 7C depicts a process flow for a Delayed-LOS scheduling process which is based on the pseudo code Algorithm 1 depicted in FIG. 10. For purposes of completeness, the method of FIGS. 7A, 7B and 7C will be discussed in conjunction with the Algorithm 1 shown in FIG. 10. In general, a Delayed-LOS scheduling process according to an embodiment of the invention is based, in part, on the LOS process which uses dynamic programming for the Basic_DP and Reservation_DP processes, as discussed above. In the Algorithm 1 of FIG. 10, a Delayed-LOS protocol utilizes a Basic_DP (Line 7 of Algorithm 1) in which a queue of batch jobs is processed, with emphasis on the head batch job in queue, to find a combination of pending batch jobs that would maximize current system utilization.

In contrast to the standard LOS process as discussed above, a Delayed-LOS process according to an embodiment of the invention utilizes an attribute scount, which represents the number of times the head job in waiting queue is skipped while selecting jobs for scheduling using a Basic_DP process. The Delayed-LOS protocol determines if the batch job at the head of the batch jobs queue fits within the free capacity of the system, and the head batch job may or may not be started or scheduled at that time depending on the scount parameter for the head batch job. The value of scount is initially set to zero for a new head job and is increased by one at every scheduling cycle if the head job is not selected in that schedule cycle using the Basic_DP (see Lines 6-11 of Algorithm 1). When the scount parameter exceeds the pre-determined maximum skip count threshold (Cs), the Delayed-LOS process calls the Reservation_DP process (see Lines 3-5, and 12-20 of Algorithm 1). This scheduling protocol allows bounding of the waiting time of a head batch job when the scount parameter exceeds Cs. The value of Cs can be selected through experimentation, wherein formulating a systematic or analytical methodology to compute the optimal value of Cs using any characteristics of the workload is a non-trivial problem, which involves consideration of multiple workload characteristics such as job arrival time, job arrival rate, job size, job execution time, etc.

Referring to FIG. 7A, a new Delayed-LOS scheduling cycle is started in response to a triggering event (Block 700). In an embodiment of the invention, a scheduling cycle is triggered by the arrival of a new batch job into the batch jobs queue, the departure of completed job from the HPC system, or the arrival of an ECC command that triggers a change in runtime requirement of a batch job in queue or already running in the system. When a triggering event occurs, the scheduler determines a number, m, of currently available computing nodes (block 702). In particular, assuming M denotes a total number of computing nodes (processors) that are available on an HPC system, the total number m of free or unreserved computing nodes that are available at a given time t is equal to the total number of computing nodes M (maximum system capacity) less the total amount of all computing nodes that are being used by all active/running jobs at that given time (see, Line 1 of Algorithm 1).

If there are no available computing nodes (i.e., m=0) at the given time (negative determination in block 704), then the scheduling cycle ends (block 718). If there are available computing nodes (i.e., m>0) (affirmative determination in block 704), a determination is then made as to whether there are batch jobs waiting in the batch jobs queue (block 706). If the batch jobs queue is empty (affirmative decision in block 706), then the scheduling cycle ends (block 718). Blocks 704 and 706 correspond to Line 2 of Algorithm 1.

On the other hand, if the batch jobs queue is not empty (negative determination in step 706), the parameters num and scount for the batch job at the head of the batch jobs queue are examined (blocks 708 and 710). As noted above, the parameter num denotes the number of nodes that are required to execute the batch job, and the parameter scount denotes a number of scheduling cycles in which the batch job was skipped and not scheduled. If the number (num) of computing nodes required for the head batch job is less than or equal to the number m of available computing nodes and (ii) if the scount value of the head batch job is greater than or equal to the threshold value $C_s$ (affirmative determination in blocks 708 and 710), then the head batch job is removed from the batch jobs queue (block 712), and the head batch job is added to the list $\mathcal{A}$ of active/running jobs (block 714). The head batch job is activated in the HPC system (block 716) and the current scheduling cycle ends (block 718). The scheduler then enters a wait state (block 720) for the occurrence of a next triggering event to initiate a new scheduling cycle. In FIG. 7A, affirmative decisions in blocks 708 and 710 correspond to Line 3 of Algorithm 1, blocks 712 and 714 correspond to Line 4 of Algorithm 1, and block 716 corresponds to Line 5 of Algorithm 1.

On the other hand, if the number (num) of computing nodes required for the head batch job is less than or equal to the number m of available computing nodes, but the scount value of the head batch job is NOT greater than or equal to the threshold value $C_s$ (affirmative determination in block 708, and negative determination in block 710), then the scheduling process proceeds to block 722 in FIG. 7B. Referring to FIG. 7B, the process continues by calling the Basic_DP method to process the batch jobs queue to determine a set of jobs that will maximize system utilization (block 722). A set $S$ of batch jobs selected to be scheduled at time t is computed after the Basic_DP process is called (block 724). If the head batch job is not within the set $S$ of jobs selected to be scheduled at time t, the skip count value, scount, of the head batch job is increased by one (block 726). The set $S$ of batch jobs selected to be scheduled is removed from the batch jobs queue and added to the list $\mathcal{A}$ of active/running jobs (block 728). The set $S$ of selected batch jobs are then activated in the HPC system (block 730) and the current scheduling cycle ends (return to block 718, FIG. 7A). It is to be noted that Line 6 of Algorithm 1 corresponds to an affirmative determination in block 708 and negative determination in block 710, and that blocks 722, 724, 726, 728 and 730 correspond to Lines 7, 8, 9, 10 and 1, respectively, of Algorithm 1.

Referring back to block 708 of FIG. 7A, if the number (num) of computing nodes required for the head batch job is NOT less than or equal to the number m of available computing nodes (negative determination in block 708 (see Line 12 of Algorithm 1), then the scheduling process proceeds to block 732 in FIG. 7C. Referring to FIG. 7C, the scheduling process proceeds by determining a number (s) of active jobs (starting from the smallest job and increasing in size) which must be finished before there are enough computing nodes available to meet the requirements of the head batch job in the batch jobs queue (block 732). As noted above, the set of all active jobs $\mathcal{A}$ is maintained as a sorted list in increasing order of residual duration, $a_1 \cdot res \leq a_2 \cdot res \leq \ldots \leq a_A \cdot res$. With this step (block 732), an index value s is determined representing an index of the active job $a_i$ where i=s, such that:

$$m+\Sigma_{i=1}^{s-1} a_i \cdot num < w_1^b \cdot num \leq m+\Sigma_{i=1}^{s} a_i \cdot num \text{ (see Line 13 of Algorithm 1)}$$

Next, a freeze end time, $fret_b$, is computed by adding the remaining execution time (res) of the active job of index s ($a_s$) to the current time t (block 734). Then, a freeze end capacity, $frec_b$, is computed by adding the number of available computing nodes m, plus the total number of required computing nodes for all active jobs in the active list from $a_1$ to $a_s$, less the number of computing nodes required for the head batch job (block 736). More specifically, in an embodiment of the invention, the freeze end capacity, $frec_b$, is computed as:

$$frec_b = m + \Sigma_{i=1}^{s} a_i \cdot num - w_1^b \cdot num \text{ (See Line 15 of Algorithm 1).}$$

Next, for each batch job in the batch jobs queue having a required number of computing nodes that is less than or equal to m, we compute the number of computing nodes required at the freeze end time for that batch job (block 738). As noted above, frenum denotes a number of computing nodes required at the "freeze end time" for batch jobs present in the batch jobs queue, $\mathcal{W}^b$. The frenum of a given batch job will be zero (0) if the current time (t)+the duration (dur) or user-estimated execution time of the batch job is less than the freeze end time, $fret_b$. Otherwise, the frenum of a given batch job will be set equal to the number of required computing nodes (num) for that batch job (see Line 16 of Algorithm 1).

Thereafter, the Reservation_DP method is called to make a reservation for scheduling the head job for future execution based on the computed freeze end capacity (block 740). A set $S_f$ of all jobs selected to be scheduled at time t is then determined after the Reservation_DP process is called (block 742). The set $S_f$ of batch jobs selected to be scheduled is removed from the batch jobs queue and added to the list $\mathcal{A}$ of active/running jobs (block 744). The set $S_f$ of selected batch jobs are then activated in the HPC system (block 746) and the current scheduling cycle ends (return to block 718, FIG. 7A). It is to be noted that blocks 740, 742, 744 and 746, correspond to Lines 17, 18, 19, and 20, respectively, of Algorithm 1 (FIG. 10). It is to be understood that the process of blocks 742-746 operates to delay the scheduling of the head job in the batch queue when there is not enough available computing nodes (processors) to execute the job. The head job is delayed to a future time equal to the freeze end time. Instead, other smaller batch jobs in the batch jobs queue are scheduled which have a total size that is less than the number of available computing nodes.

Figure 8A:
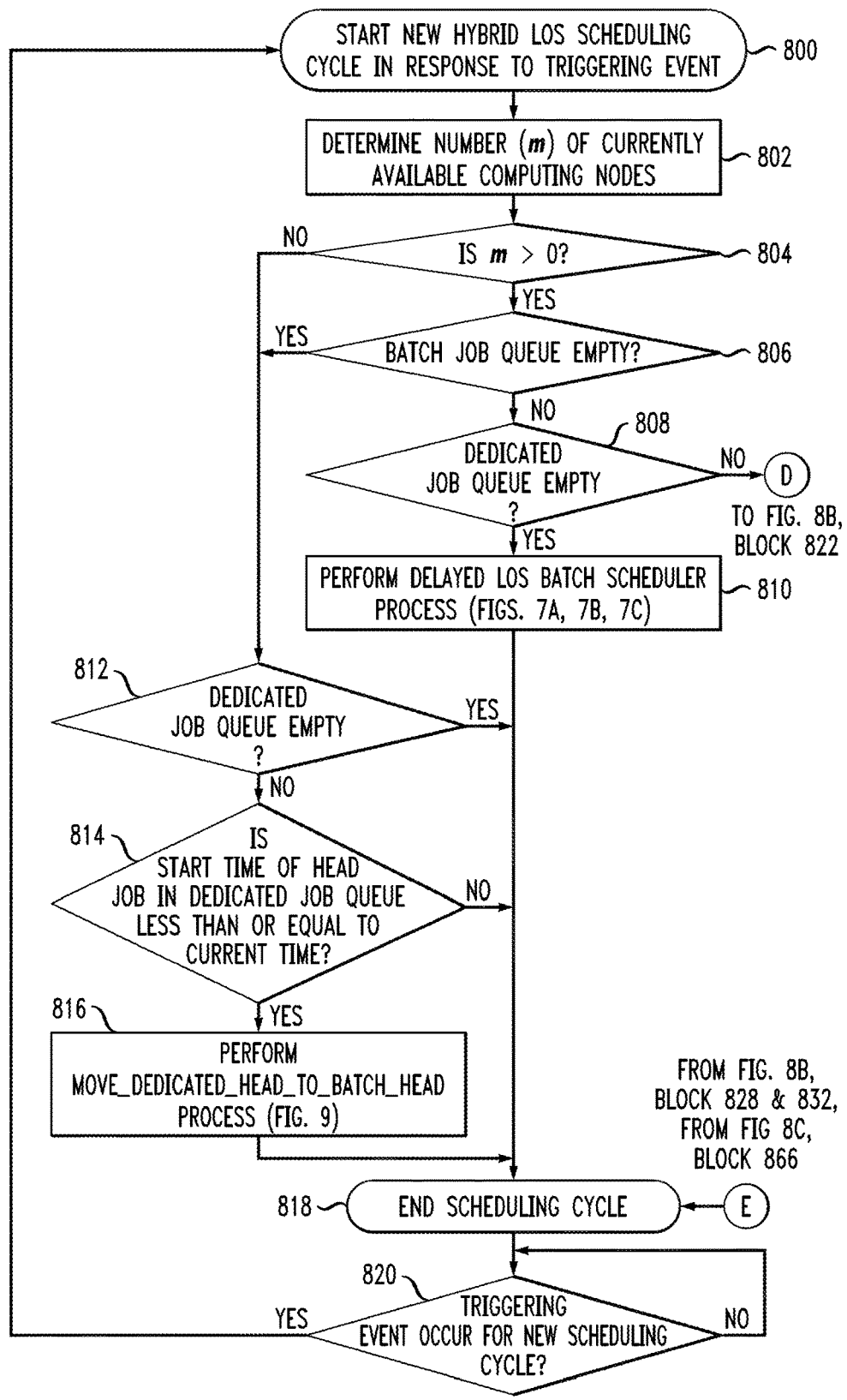
FIGS. 8A, 8B and 8C depict a flow diagram of a method for scheduling a heterogeneous workload comprising batch jobs and dedicated jobs, according to an embodiment of the invention.
Figure 8B:
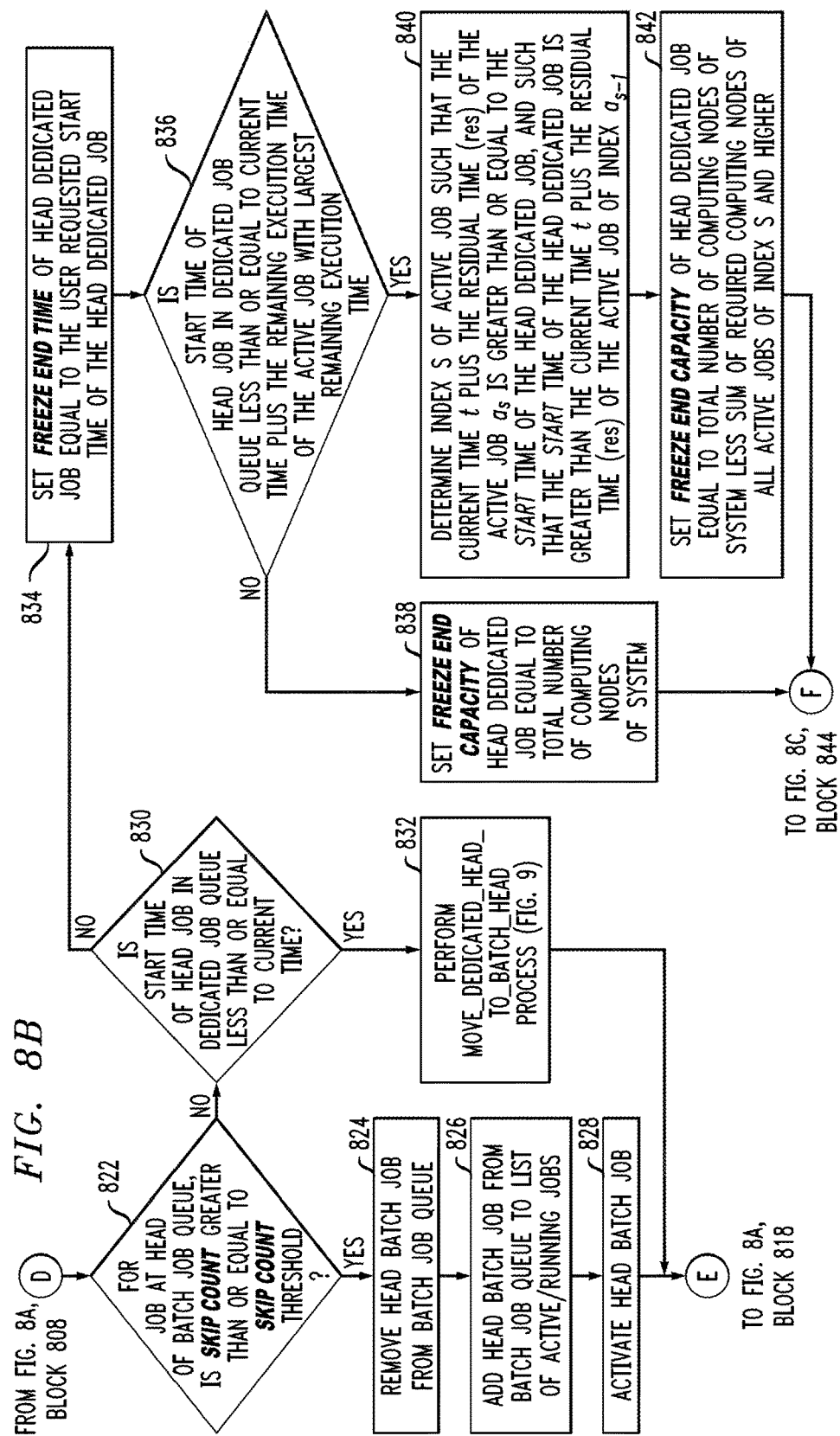
Figure 8C:
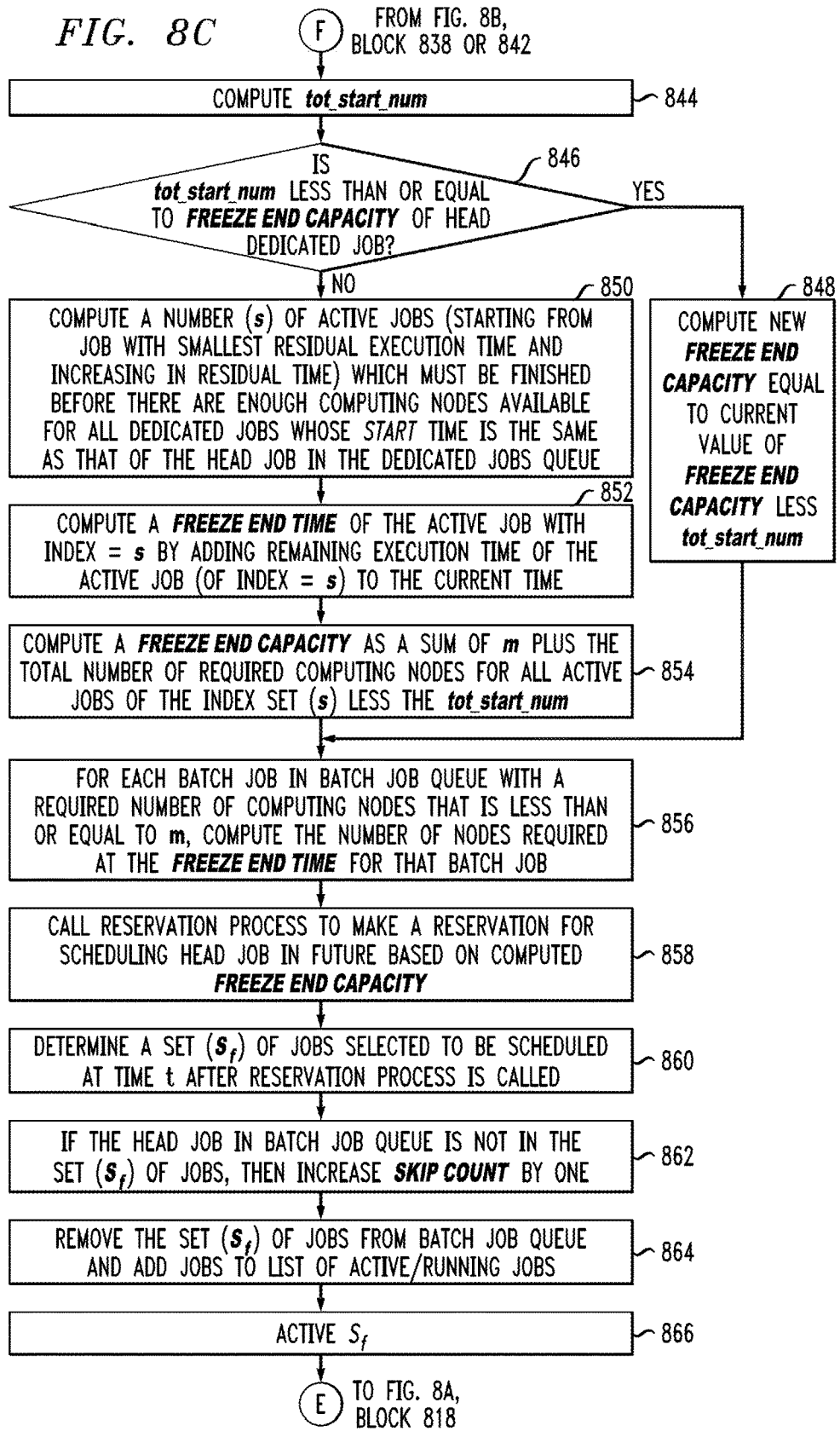

FIGS. 8A, 8B and 8C depict a flow diagram of a method for scheduling a heterogeneous workload comprising batch jobs and dedicated jobs, according to an embodiment of the invention. More specifically, FIGS. 8A, 8B and 8C depict a process flow for a Hybrid-LOS scheduling process which is based on the pseudo code Algorithms 2 and 3 shown in FIG. 11. In general, a Hybrid-LOS scheduling process according to an embodiment of the invention is based on an extension of the Delayed-LOS process for processing heterogeneous workloads comprising both batch and dedicated jobs, wherein batch jobs are scheduled in the presence of dedicated jobs that are required to be scheduled at a user-requested start time. In FIG. 6, the dedicated jobs queue 612 is used by the scheduler 610 to temporarily store waiting dedicated jobs. While batch jobs in the batch jobs queue 611 are selected to be scheduled with the objective of maximizing utilization, dedicated jobs are scheduled at their requested start time (or at some later time within the user and/or system specified tolerance). To implement this scheduling protocol, explicit reservations are made for dedicated jobs in the future and batch jobs are scheduled around the dedicated jobs using an approach similar to the Delayed-LOS process as discussed above. In this regard, a Hybrid-LOS process can be considered an extension of the Delayed-LOS process to support heterogeneous workloads.

A Hybrid-LOS process according to an embodiment of the invention is presented as Algorithm 2 in FIG. 11. In general, a Hybrid-LOS process begins by determining if the dedicated queue is empty (see Line 3 of Algorithm 2). If there are no dedicated jobs in queue, then batch jobs are scheduled using a Delayed-LOS algorithm (see Line 4 of Algorithm 2). Otherwise, if the requested start time of the first dedicated job has been reached, the dedicated job is moved to the head of batch queue to be scheduled in the next scheduling cycle, see Lines 6-7 of Algorithm 2, wherein Algorithm 3 of FIG. 11 illustrates a process for moving the head dedicated job into a head position of the batch jobs queue. If the requested start time of the head dedicated job has not been reached, then a "freeze end time" and "freeze end capacity" are computed (see Lines 8-15 of Algorithm 2) for scheduling batch jobs around the head dedicated job with explicit reservations for the head dedicated job. For a given requested start time of the head dedicated job in queue, in the future, if there is enough capacity for all other dedicated jobs with identical start times (see Lines 16-17 of Algorithm 2), then batch jobs are scheduled around these dedicated jobs (see Lines 18-22 of Algorithm 2). Since there is enough capacity for all dedicated jobs, the dedicated jobs will be scheduled on time at their requested start times. If enough capacity is not available, batch jobs are scheduled around the dedicated jobs, but some dedicated jobs will be scheduled with a delay with regard to their requested start times (see Lines 24-30 of Algorithm 2), as there is insufficient capacity available for dedicated jobs. Moreover, a provision is made to handle a situation when the scount parameter value of the head batch job surpasses the skip count threshold Cs (see Lines 35-37 of Algorithm 2) and provision is made to handle the dedicated jobs queue when batch jobs queue is empty (see Lines 39-42 of Algorithm 2). The Hybrid-LOS scheduling protocol of Algorithm 2 of FIG. 11 will now be discussed in greater detail with regard to FIGS. 8A, 8B and 8C.

Referring to FIG. 8A, a new Hybrid-LOS scheduling cycle is started in response to a triggering event (Block 800). In an embodiment of the invention, a scheduling cycle is triggered by the arrival of a new batch job into the batch jobs queue 611, the arrival of a new dedicated job into the dedicated jobs queue 612, the departure of completed batch job or dedicated job from the HPC system 620, or the arrival of an ECC command that triggers a change in runtime requirement of either a batch job or dedicated job in queue or already running in the HPC system 620. When a triggering event occurs, the scheduler 600 determines a number, m, of currently available computing nodes (block 802). In particular, assuming M denotes a total number of computing nodes (processors) that are available on the HPC system 620, the total number m of free computing nodes that are available at a given time t is equal to the total number of computing nodes M less the total amount of all computing nodes that are being used by all active/running batch and dedicated jobs (see, Line 1 of Algorithm 2).

If there are available computing nodes (i.e., m>0) (affirmative determination in block 804), a determination is then made as to whether there are batch jobs waiting in the batch jobs queue (block 806). If the batch jobs queue is not empty (negative decision in block 806), then a determination is then made as to whether there are dedicated jobs waiting in the dedicated jobs queue (block 808). If the dedicated jobs queue is empty (affirmative decision in block 808), the scheduler 600 performs a Delayed-LOS scheduling process as discussed above with reference to FIGS. 7A, 7B and 7C (block 810), and the scheduling cycle ends (block 818). Thus, if there are available computing nodes, and there are batch jobs in queue but no dedicated jobs in queue, then a standard Delayed-LOS process is commenced (see Lines 2, 3, 4 of Algorithm 2).

Alternatively, if there are available computing nodes (m>0) (affirmative decision in block 804), but the batch jobs queue is empty (affirmative decision in block 806) and the dedicated jobs queue is empty (affirmative decision in block 812), then the scheduling cycle ends (block 818) (See Lines 2, 39, 43 and 44 of Algorithm 2).

Moreover, if there are available computing nodes (m>0) (affirmative decision in block 804), and the batch jobs queue is empty (affirmative decision in block 806) and the dedicated jobs queue is not empty (negative decision in block 812), a determination is made as to whether the start time (start) of the head job in the dedicated jobs queue is less than or equal to the current time t (block 814). If the start time (start) of the head job in the dedicated jobs queue is less than or equal to the current time t (affirmative determination in block 814), then the head dedicated job in the dedicated jobs queue is moved to the head position of the batch jobs queue (block 816) using a process shown in FIG. 9 (which is Algorithm 3 shown in FIG. 11), which will be discussed in further detail below. If the start time (start) of the head job in the dedicated jobs queue is NOT less than or equal to the current time t (negative determination in block 814), then the scheduling cycle ends (block 818), and the scheduler 610 enters into a wait state for the next triggering event (block 820). It is to be noted that blocks 812, 814 and 816 correspond to Lines 39, 40 and 41 of Algorithm 2).

Alternatively, if there are available computing nodes (m>0) (affirmative determination in block 804), and the batch jobs queue is NOT empty (negative determination in block 806) and the dedicated jobs queue is NOT empty (negative determination in block 808), then the scheduling process proceeds to block 822 in FIG. 8B. Referring to FIG. 8B, a determination is made as to whether the skip count (scount) of the head batch job at the head of the batch jobs queue is greater than or equal to the skip count threshold (block 822). If the scount value of the head batch job is greater than or equal to the threshold value $C_s$ (affirmative determination in block 822), then the head batch job is removed from the batch jobs queue (block 824), and the head batch job is added to the list $\mathcal{A}$ of active/running jobs (block 826). The head batch job is activated in the HPC system (block 828) and the current scheduling cycle ends (return to block 818 in FIG. 8A). The scheduler 610 then enters a wait state (block 820, FIG. 8A) for the occurrence of a next triggering event to initiate a new scheduling cycle. In FIG. 8B, blocks 822, 824, 826, and 828 correspond to Lines 35, 36, and 37 of Algorithm 2.

On the other hand, if the scount value of the head batch job is NOT greater than or equal to the threshold value $C_s$ (negative determination in block 822), then a determination is made as to whether the start time of the head dedicated job in the dedicated jobs queue is less than or equal to the current time (block 830). If the start time of the head dedicated job in the dedicated jobs queue is less than or equal to the current time (affirmative determination block 830), then the head dedicated job in the dedicated jobs queue is moved to the head position of the batch jobs queue (block 832) using the process shown in FIG. 9. It is to be noted that blocks 830 and 832 correspond to Lines 6 and 7 of Algorithm 2 shown in FIG. 11.

If the start time of the head dedicated job in the dedicated jobs queue is NOT less than or equal to the current time (negative determination block 830), then a freeze end time of the head dedicated job in the dedicated jobs queue is set equal to the user-requested start time of the head dedicated job (block 834) (see Lines 8 and 9 of Algorithm 2). A determination is then made as to whether the start time of the head dedicated job in the dedicated jobs queue is less than or equal to the current time t plus the remaining execution time of the active job with the largest remaining execution time (block 836). If the start time of the head dedicated job in the dedicated jobs queue is NOT less than or equal to the current time t plus the remaining execution time of the active job with the largest remaining execution time (negative determination in block 836), then the freeze end capacity of the head dedicated job is set equal to the total number of computing nodes in the HPC system (block 838) and the process flow proceeds to block 844 in FIG. 8C. It is to be noted that blocks 836 and 838 correspond to Lines 10, 13 and 14 of Algorithm 2.

On the other hand, if the start time of the head dedicated job in the dedicated jobs queue is less than or equal to the current time t plus the remaining execution time of the active job with the largest remaining execution time (affirmative determination in block 836), then an index (s) is determined for an active job $a_i$, where i=s (block 840) with the condition that:

$$t+a_{s-1} \cdot res<w_1^d \cdot start \leq t+a_s \cdot res \text{ (see Lines 10 and 11 of Algorithm 2)}.$$

As noted above, the set of all active jobs $\mathcal{A}$ is maintained as a sorted list in increasing order of residual duration, $a_1 \cdot res \leq a_2 \cdot res \leq \ldots \leq a_A \cdot res$. Therefore, with this process (block 840), the active job ($a_s$) with index s is determined such that the current time t plus the residual time (res) of the active job $a_s$ is greater than or equal to the start time of the head dedicated job, and such that the start time of the head dedicated job is greater than the current time t plus the residual time (res) of the active job ($a_{s-1}$) with index s−1.

Next, based on the computed index s, the freeze end capacity of the head dedicated job is set equal to the total number M of computing nodes of the HPC system less the sum of all required computing nodes for all active jobs of index s and higher (block 842). In other words, the freeze end capacity of the head dedicated job is computed as: $frec_d = M - \Sigma_{i=s}^A a_i \cdot num$ (see Line 12 of Algorithm 2). The process flow then proceeds to block 844 in FIG. 8C.

More specifically, referring to FIG. 8C, once the freeze end capacity of the head dedicated job is computed (in block 838 or 842 of FIG. 8B), the process proceeds to compute a tot_start_num (block 844). The tot_start_num is the sum of the number of computing nodes (processors) required by all dedicated jobs whose start time is the same as the head dedicated job in the dedicated queue. In other words, the sum of number of computing nodes (processors) required by all jobs in dedicated queue that are supposed to start at the same time as the head dedicated job in the dedicated jobs queue (see Line 16 of Algorithm 2).

A determination is made as to whether the tot_start_num is less than or equal to the freeze end capacity of the head dedicated job (block 846) (see Line 17 of Algorithm 2). If the tot_start_num is less than or equal to the freeze end capacity of the head dedicated job (affirmative determination in block 846), then a new freeze end capacity is computed equal to the current value of the freeze end capacity less the tot_start_num (block 848) (see Line 18 of Algorithm 2). Thereafter, for each batch job in the batch jobs queue having a required number of computing nodes that is less than or equal to m, we compute the number of computing nodes required at the freeze end time for that batch job (block 856). As noted above, the parameter frenum denotes a number of computing nodes required at the "freeze end time" for batch jobs present in the batch jobs queue, $\mathcal{W}^b$. The frenum value for a given batch job will be zero (0) if the current time (t)+the duration (dur) or user-estimated execution time of the batch job is less than the freeze end time, $fret_d$. Otherwise, the frenum value of a given batch job will be set equal to the number of required computing nodes (num) for that batch job (see Line 19 of Algorithm 2).

Thereafter, the Reservation_DP method is called to make a reservation for scheduling the head job for future execution based on the computed freeze end capacity, $frec_d$, and the frenum values of the batch jobs (block 858) (see Line 20 of Algorithm 2). A set $\mathcal{S}_f$ of all jobs selected to be scheduled at time t is then determined after the Reservation_DP process is called (block 860) (see Line 21 of Algorithm 2). If the head job in the batch jobs queue is not in the set $\mathcal{S}_f$ of selected jobs, then the skip count (scount) of the head job in the batch jobs queue is increased by one (block 862) (see Line 22 of Algorithm 2). The set $\mathcal{S}_f$ of batch jobs selected to be scheduled is removed from the batch jobs queue and added to the list $\mathcal{A}$ of active/running jobs (block 864) (see Line 32 of Algorithm 2). The batch jobs in the set $\mathcal{S}_f$ of selected batch jobs are activated in the HPC system (block 866) (see Line 33 of Algorithm 2), and the current scheduling cycle ends (return to block 818, FIG. 8A).

On the other hand, referring back to block 846 of FIG. 8C, if the tot_start_num is NOT less than or equal to the freeze end capacity of the head dedicated job (negative determination in block 846), then Lines 24, 25 and 26 of Algorithm 2 are executed. In particular, the scheduling process proceeds by determining a number (s) of active jobs (starting from the smallest job and increasing in size) which must be finished before there are enough computing nodes available for all dedicated jobs whose start time is the same as that of head de d b in the dedicated queue (block 850). As noted above, the set of all active jobs $\mathcal{A}$ is maintained as a sorted list in increasing order of residual duration, $a_1 \cdot res \leq a_2 \cdot res \leq \ldots \leq a_A \cdot res$. With this step (block 850), an index s is determined representing an index of the active job $a_i$ where i=s, such that: $m + \Sigma_{i=1}^{s-1} a_i \cdot num < tot\_start\_num \leq m + \Sigma_{i=1}^s a_i \cdot num$ (see Line 24 of Algorithm 2).

Next, a freeze end time, $fret_d$, is computed by adding the remaining execution time (res) of the active job of index s ($a_s$) to the current time t (block 852) (see Line 25 of Algorithm 2). Then, a freeze end capacity, $frec_d$, is computed by adding the number of available computing nodes m, plus the total number of required computing nodes for all active jobs in the active list from $a_1$ to $a_s$ less the tot_start_num (block 854). More specifically, in an embodiment of the invention, the freeze end capacity, $frec_d$, is computed as:

$$frec_d = m + \Sigma_{i=1}^s a_i \cdot num - tot\_start\_num \text{ (See Line 26 of Algorithm 2)}.$$

Thereafter, the process proceeds with blocks 856, 858, 860, 862, 864 and 866 (as discussed above), and the scheduling cycle ends (proceed to block 818 of FIG. 8A) and the scheduler enters a wait state for the next triggering event (block 820).

Figure 9:
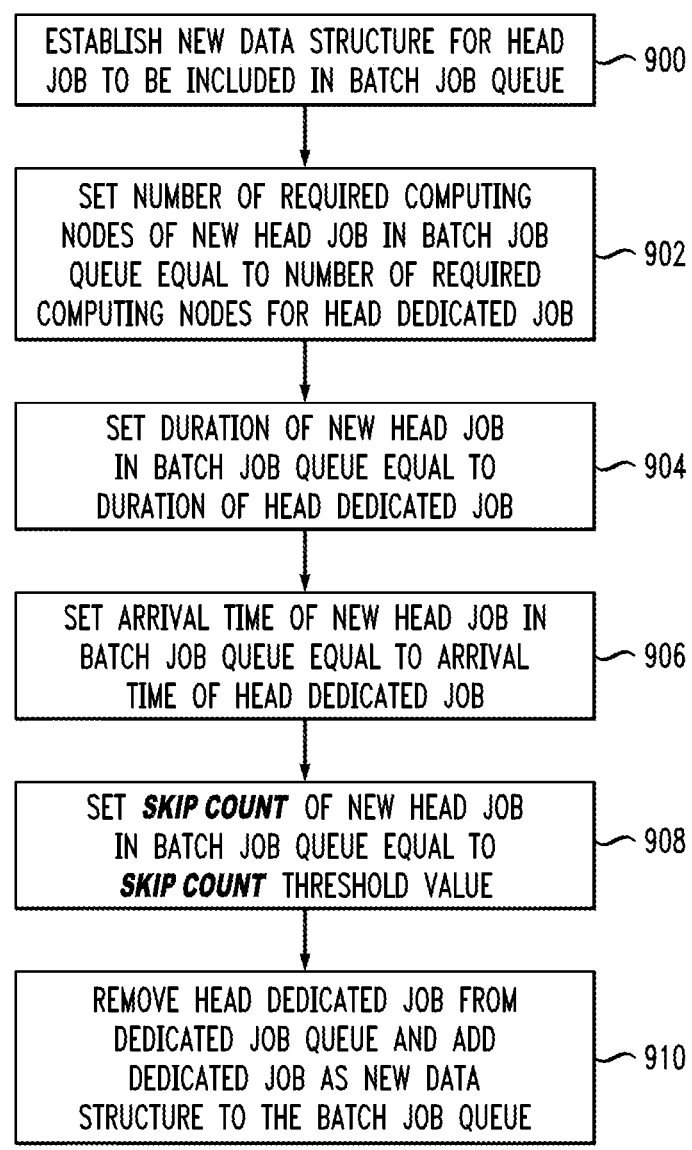
FIG. 9 is a flow diagram of a method for moving a dedicated job into a head position of a batch jobs queue, according to an embodiment of the invention.

FIG. 9 is a flow diagram of a method for moving a head dedicated job into a head position of a batch jobs queue, according to an embodiment of the invention. In particular, FIG. 9 is a block diagram illustrating a process flow of the Algorithm 3 shown in FIG. 11 for a Move_Dedicted_Head_To_Batch_Head process, according to an embodiment of the invention. FIG. 9 shows a process flow that is implemented in block 816 of FIG. 8A block 832 of FIG. 8B. Referring to FIG. 9, when the Move_Dedicted_Head_To_Batch_Head process is called, a first step includes establishing a new data structure for a head job to be included in the batch jobs queue (block 900). Next, the parameter num for the new head job in the batch queue is set equal to the number of required computing nodes for the head dedicated job (block 902). The duration (dur) parameter of the new head job in the batch queue is then set to the duration of the head dedicated job (block 904). The arrival time (arr) parameter for the new head job in the batch queue is set equal to the arrival time of the head dedicated job (block

906). The skip count (scount) parameter of the new head job in the batch queue is set equal to the skip count threshold value (block 908). Finally, the head dedicated job is removed from the dedicated jobs queue and added as the new data structure to the batch jobs queue (block 910).

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-11, the diagrams in the figures illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 12:
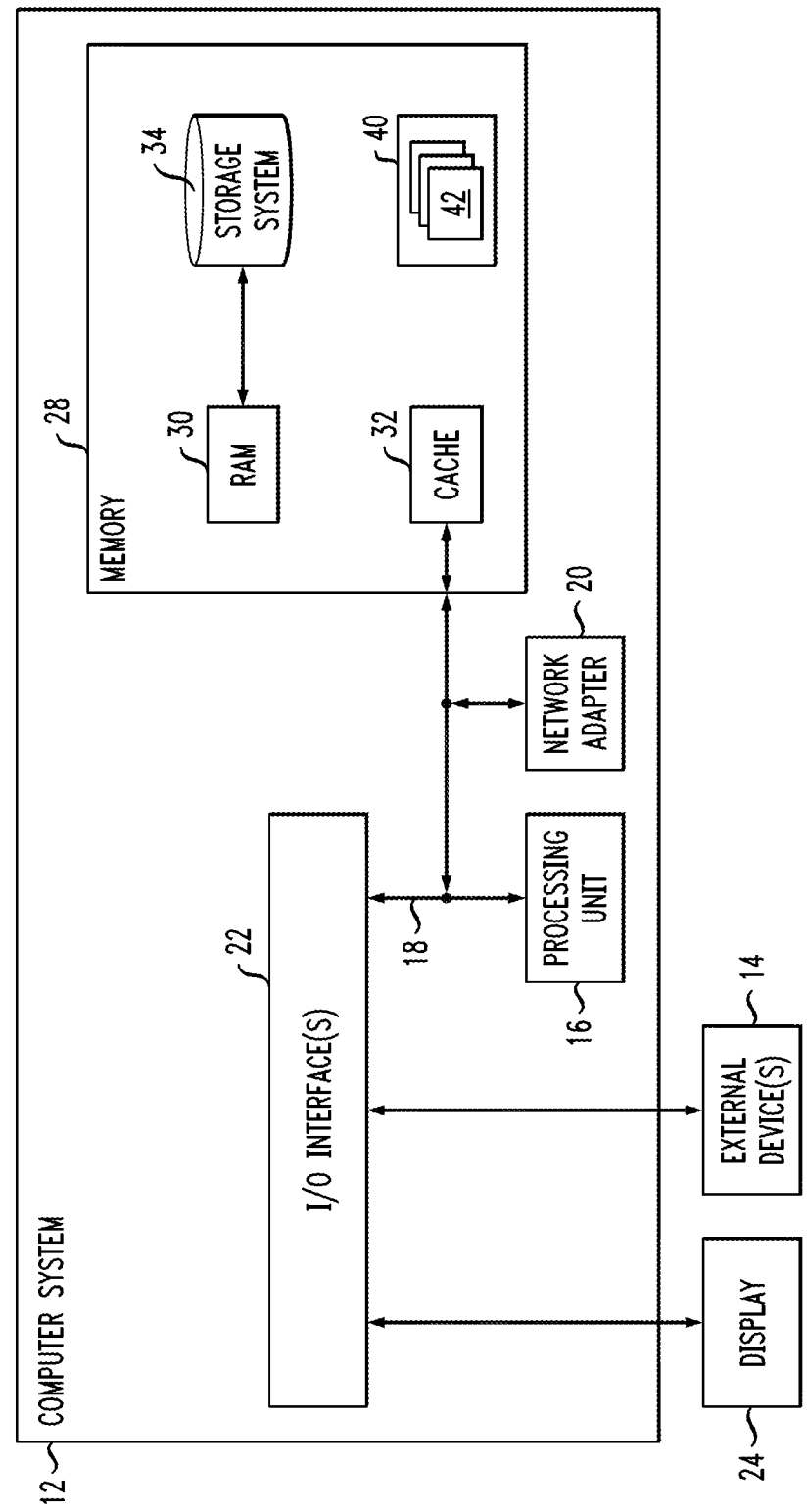
FIG. 12 illustrates a computer system that may be used to implement one or more components/steps of the techniques of the invention, according to an exemplary embodiment of the invention.

One or more embodiments can make use of software running on a general-purpose computer or workstation. With reference to FIG. 12, in a computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention. The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system, comprising:
a memory device to store program instructions for scheduling jobs in a HPC (high-performance computing) system; and
a processor coupled to the memory, wherein the processor executes the program instructions stored in the memory to cause the computing system to perform a method comprising:
maintaining a batch jobs queue to temporarily store batch jobs received by the HPC system, wherein the batch jobs are ordered according an order of arrival;
setting a skip count parameter to an initial value for a current batch job in the batch jobs queue which is deemed a head batch job based on the order of arrival of the batch jobs, wherein the skip count parameter for the head batch job is incremented each time the head batch job is skipped and not scheduled for execution by the HPC system, and wherein no skip count parameter is maintained for a non-head batch job in the batch jobs queue;
performing a scheduling process cycle at a given time to schedule one or more batch jobs pending in the batch jobs queue for execution by the HPC system, wherein performing the scheduling process cycle comprises:
determining an available processor capacity of the HPC system at the given time;
determining an assigned processor capacity for executing the head batch job in the batch jobs queue;

determining a number of previous scheduling process cycles that the head batch job was skipped and not scheduled for execution by the HPC system based on a current value of the skip count parameter for the head batch job;

scheduling the head batch job for execution by the HPC system at the given time when (i) the assigned processor capacity for executing the head batch job is less than or equal to the available processor capacity of the HPC system and (ii) the number of previous scheduling process cycles that the head batch job was skipped and not scheduled for execution by the HPC system reaches a predetermined skip count threshold, and setting the skip count parameter to an initial value for another batch job in the batch jobs queue which is deemed to be a new head batch job in the batch jobs queue;

skipping a scheduling of the head batch job for execution by the HPC system at the given time when (i) the assigned processor capacity for executing the head batch job is less than or equal to the available processor capacity of the HPC system, (ii) the number of previous scheduling process cycles that the head batch job was skipped and not scheduled for execution by the HPC system is less than the predetermined skip count threshold, and (iii) a set of one or more batch jobs exists in the batch jobs queue which can be scheduled for execution at the given time to maximize utilization of the processor capacity of the HPC system without scheduling execution of the head batch job; and scheduling a future time for executing the head batch job by the HPC system when the assigned processor capacity for executing the head batch job exceeds the available processor capacity of the HPC system.

2. The computing system of claim 1, wherein the assigned processor capacity for executing the head batch job, and the number of previous scheduling process cycles that the head batch job was skipped and not scheduled for execution by the HPC system comprise parameters that are stored in association with the head batch job in the batch jobs queue.

3. The computing system of claim 1, wherein skipping a scheduling of the head batch job for execution by the HPC system at the given time comprises:

determining the set of one or more batch jobs in the batch jobs queue which can be scheduled for execution at the given time based on an assigned processor capacity of each of the batch jobs in the batch jobs queue; and increasing by one, the number of previous scheduling process cycles that the head batch job was skipped and not scheduled for execution by the HPC system.

4. The computing system of claim 1, wherein performing the scheduling process cycle further comprises:

scheduling the head batch job for execution by the HPC system at the given time along with one or more additional batch jobs in the batch jobs queue when (i) the assigned processor capacity for executing the head batch job is less than or equal to the available processor capacity of the HPC system, (ii) the number of previous scheduling process cycles that the head batch job was skipped and not scheduled for execution by the HPC system is less than the predetermined skip count threshold, and (iii) the one or more additional batch jobs can be scheduled for execution at the given time along with the head batch job to maximize utilization of the processor capacity of the HPC system.

5. The computing system of claim 1, wherein scheduling the future time for executing the head batch job by the HPC system when the assigned processor capacity for executing the head batch job exceeds the available processor capacity of the HPC system comprises:

making a reservation time for executing the head batch job at the future time based on a remaining execution time of each active job being executed in the HPC system; and selecting a set of one or more batch jobs in the batch jobs queue which can be scheduled for execution before the reservation time of the head batch job.

6. The computing system of claim 5, wherein making the reservation time for executing the head batch job comprises:

accessing a list of active jobs in which all active jobs executing in the HPC system are sorted starting from an active job with a smallest remaining execution time to an active job with a largest remaining execution time;

utilizing the list of active jobs to determine a set of active jobs, starting from the active job with the smallest remaining execution time, which will result in a sufficient amount of available processor capacity for the head batch job when execution of each active job in the set of active jobs is finished;

computing a first value by adding to the given time a remaining execution time of an active job in the set of active jobs which has a greatest remaining execution time;

computing a second value as a sum of (i) the available processor capacity of the HPC system at the given time and (ii) a total of each assigned processor capacity of each active job in the set of active jobs, less the assigned processor capacity for the head batch job;

for each batch job in the batch jobs queue with an assigned processor capacity that is less than or equal to the available processor capacity of the HPC system at the given time, computing a third value which represents a total process or capacity of the HPC system that is required by the batch job at the computed first value; and making a reservation time for executing the head batch job based on the computed second value and the computed third value of each batch job.

7. The computing system of claim 6, wherein the third value of a given batch job is set equal to 0 when the given time plus an estimated execution time of the given batch job is less than the first value, otherwise the third value of a given batch job is set equal to an assigned processor capacity for executing the given batch job.

8. The computing system of claim 1, wherein performing the scheduling process cycle comprises commencing the scheduling process cycle in response to a triggering event.

9. The computing system of claim 8, wherein the triggering event comprises an arrival of a new batch job in the batch jobs queue or termination of an executing batch job in the HPC system.

10. The computing system of claim 8, wherein the triggering event comprises an arrival of a command that triggers a change in an estimated execution time of a batch job that is pending in the batch jobs queue or an active batch job that is executing in the HPC system.

11. A computing system, comprising:

a memory device to store program instructions for scheduling jobs in a HPC (high-performance computing) system; and a processor coupled to the memory, wherein the processor executes the program instructions stored in the memory to cause the computing system to perform a method comprising:

maintaining a batch jobs queue to temporarily store batch jobs received by the HPC system;

maintaining a dedicated jobs queue to temporarily store dedicated jobs received by the HPC system;

performing a scheduling process cycle at a given time to schedule one or more batch jobs pending in the batch jobs queue and one or more dedicated jobs in the dedicated jobs queue for execution by the HPC system, wherein performing the scheduling process cycle comprises:

determining an available processor capacity of the HPC system at the given time;

when (i) the HPC system is determined to have available processor capacity, (ii) the batch jobs queue and the dedicated jobs queue are not empty, and (iii) a number of previous scheduling process cycles that a head batch job in the batch jobs queue was skipped and not scheduled for execution by the HPC system is less than a predetermined skip count threshold, then:

determining if a specified start time of a head dedicated job in the dedicated jobs queue is less than or equal to the given time; and moving the head dedicated job from the dedicated jobs queue to a head position in the batch jobs queue, when the specified start time of the head dedicated job in the dedicated jobs queue is determined to be less than or equal to the given time; and when (i) the HPC system is determined to have available processor capacity, (ii) the batch jobs queue and the dedicated jobs queue are not empty, and (iii) a number of previous scheduling process cycles that the head batch job in the batch jobs queue was skipped and not scheduled for execution by the HPC system meets the predetermined skip count threshold, then:

removing the head batch job from the batch jobs queue;

adding the head batch job to a list of active jobs; and executing the head batch job;

wherein performing the scheduling process cycle further comprises:

when (i) there is no available processor capacity in the HPC system or when there are no pending batch jobs in the batch jobs queue, and when (ii) the dedicated jobs queue is not empty, then:

determining if the specified start time of a head dedicated job in the dedicated jobs queue is less than or equal to the given time; and moving the head dedicated job from the dedicated jobs queue to a head position in the batch jobs queue, when the specified start time of the head dedicated job in the dedicated jobs queue is determined to be less than or equal to the given time; and ending the scheduling cycle if the specified start time of the head dedicated job in the dedicated jobs queue is determined to be not less than or equal to the given time.

12. The computing system of claim 11, wherein performing the scheduling process cycle further comprises:

when the specified start time of the head dedicated job in the dedicated jobs queue is determined to be not less than or equal to the given time, then (i) setting a first value of the head dedicated job equal to the specified start time of the head dedicated job and (ii) determining if the specified start time of the head dedicated job in the dedicated jobs queue is less than or equal to the given time plus a remaining execution time of an active job having a greatest remaining execution time;

when the specified start time of the head dedicated job in the dedicated jobs queue is determined to be not less than or equal to the given time plus the remaining execution time of the active job having the greatest remaining execution time, then setting a second value of the head dedicated job equal to a total processor capacity of the HPC system; and when the specified start time of the head dedicated job in the dedicated jobs queue is determined to be less than or equal to the given time plus the remaining execution time of the active job having the greatest remaining execution time, then:

accessing a list of active jobs in which all active jobs executing in the HPC system are sorted starting from an active job with a smallest remaining execution time to an active job with a largest remaining execution time;

utilizing the list of active jobs to determine an index s of an active job in the list of active jobs such that the given time plus a remaining execution time of the active job with index s is greater than or equal to the specified start time of the head dedicated job, and such that the specified start time of the head dedicated job is greater than the given time plus a remaining execution time of the active job with an index s−1; and setting a second value of the head dedicated job equal to the total processor capacity of the HPC system less a sum total of each assigned processor capacity for of all active jobs with an index of s and higher.

13. The computing system of claim 12, wherein performing the scheduling process cycle further comprises:

computing a fourth value as a sum of each assigned processor capacity of all dedicated jobs whose specified start time is the same as the specified stat time of the head dedicated job in the dedicated jobs queue;

determining whether the fourth value is less than or equal to the second value of the head dedicated job;

when the fourth value is determined to be less than or equal to the second value of the head dedicated job, then:

computing a new second value equal to a current value of the second value less the fourth value;

for each batch job in the batch jobs queue with an assigned processor capacity that is less than or equal to the available processor capacity of the HPC system, computing a third value which represents an amount of processor capacity of the HPC system that is required by the batch job at the set first value; and making a reservation time for executing the head job based on the computed second value and the computed third value of each batch job.

14. The computing system of claim 13, wherein when the fourth value is determined to be not less than or equal to the second value of the head dedicated job, then:

utilizing the list of active jobs to determine a set of active jobs, starting from the active job with the smallest remaining execution time, which must be finished before there is enough processor capacity available for all dedicated jobs whose specified start time is the same as the specified start time of the head dedicated job;

computing a first value by adding the remaining execution time of an active job in the set of active jobs which has a greatest remaining execution time to the given time;

computing a second value as a sum of the available processor capacity of the HPC system plus a total of each assigned processor capacity of all active jobs in the set of active jobs, less the fourth value;

for each batch job in the batch jobs queue with an assigned processor capacity that is less than or equal to the available processor capacity of the HPC system, computing a third value which represents an amount of processor capacity of the HPC system that is required by the batch job at the computed first value; and making a reservation time for executing the head job based on the computed second value and the computed third value of each batch job.

15. The computing system of claim 11, wherein performing the scheduling process cycle at the given time comprises commencing the scheduling process cycle in response to a triggering event, wherein the triggering event comprises an arrival of a new batch job in the batch jobs queue, arrival of a new dedicated job in the dedicated jobs queue, or termination of an executing batch or dedicated job in the HPC system.

16. The computing system of claim 11, wherein performing the scheduling process cycle at the given time comprises commencing the scheduling process cycle in response to a triggering event, wherein the triggering event comprises an arrival of a command that triggers a change in an estimated execution time of a batch job or a dedicated job that is pending in the batch jobs queue or the dedicated jobs queue, or a change in an estimated execution time of active batch job that is executing in the HPC system.

17. A computing system, comprising:
a memory device to store program instructions for scheduling jobs in a HPC (high-performance computing) system; and
a processor coupled to the memory, wherein the processor executes the program instructions stored in the memory to cause the computing system to perform a method comprising:
maintaining a batch jobs queue to temporarily store batch jobs received by the HPC system;
maintaining a dedicated jobs queue to temporarily store dedicated jobs received by the HPC system;
performing a scheduling process cycle at a given time to schedule one or more batch jobs pending in the batch jobs queue and one or more dedicated jobs in the dedicated jobs queue for execution by the HPC system, wherein performing the scheduling process cycle comprises:
determining an available processor capacity of the HPC system at the given time;
when (i) the HPC system is determined to have available processor capacity, (ii) the batch jobs queue and the dedicated jobs queue are not empty, and (iii) a number of previous scheduling process cycles that a head batch job in the batch jobs queue was skipped and not scheduled for execution by the HPC system is less than a predetermined skip count threshold, then:
determining if a specified start time of a head dedicated job in the dedicated jobs queue is less than or equal to the given time; and
moving the head dedicated job from the dedicated jobs queue to a head position in the batch jobs queue, when the specified start time of the head dedicated job in the dedicated jobs queue is determined to be less than or equal to the given time; and when (i) the HPC system is determined to have available processor capacity, (ii) the batch jobs queue and the dedicated jobs queue are not empty, and (iii) a number of previous scheduling process cycles that the head batch job in the batch jobs queue was skipped and not scheduled for execution by the HPC system meets the predetermined skip count threshold, then:
removing the head batch job from the batch jobs queue;
adding the head batch job to a list of active jobs; and
executing the head batch job;
wherein performing the scheduling process cycle further comprises:
when there is available processor capacity of the HPC system, and when the batch jobs queue is not empty and the dedicated jobs queue is empty, then:
determining an assigned processor capacity for executing a head batch job in the batch jobs queue;
determining a number of previous scheduling process cycles that the head batch job was skipped and not scheduled for execution by the HPC system; and
scheduling the head batch job for execution by the HPC system at the given time when (i) the assigned processor capacity for executing the head batch job is less than or equal to the available processor capacity of the HPC system and (ii) the number of previous scheduling process cycles that the head batch job was skipped and not scheduled for execution by the HPC system reaches a predetermined skip count threshold.

18. The computing system of claim 17, wherein performing the scheduling process cycle further comprises scheduling the head batch job for execution by the HPC system at the given time along with one or more additional batch jobs in the batch jobs queue when (i) the assigned processor capacity for executing the head batch job is less than or equal to the available processor capacity of the HPC system, (ii) the number of previous scheduling process cycles that the head batch job was skipped and not scheduled for execution by the HPC system is less than the predetermined skip count threshold, and (iii) the one or more additional batch jobs can be scheduled for execution at the given time along with the head batch job to maximize utilization of the processor capacity of the HPC system.

19. The computing system of claim 17, wherein performing the scheduling process cycle further comprises scheduling a future time for executing the head batch job by the HPC system when the assigned processor capacity for executing the head batch job exceeds the available processor capacity of the HPC system, wherein scheduling the future time comprises:
making a reservation time for executing the head batch job at the future time based on a remaining execution time of each active job being executed in the HPC system; and
selecting a set of one or more batch jobs in the batch jobs queue which can be scheduled for execution before the reservation time of the head batch job.

* * * * *